US006958864B2

(12) United States Patent
McGuire, Jr.

(10) Patent No.: US 6,958,864 B2
(45) Date of Patent: *Oct. 25, 2005

(54) STRUCTURES AND METHODS FOR REDUCING POLARIZATION ABERRATION IN INTEGRATED CIRCUIT FABRICATION SYSTEMS

(75) Inventor: James P. McGuire, Jr., Pasadena, CA (US)

(73) Assignee: ASML Netherlands B.V., Veldhoven (NL)

(*) Notice: Subject to any disclaimer, the term of this patent is extended or adjusted under 35 U.S.C. 154(b) by 1 day.

This patent is subject to a terminal disclaimer.

(21) Appl. No.: 10/331,103

(22) Filed: Dec. 26, 2002

(65) Prior Publication Data

US 2004/0036985 A1 Feb. 26, 2004

Related U.S. Application Data

(60) Provisional application No. 60/432,688, filed on Dec. 11, 2002, and provisional application No. 60/405,853, filed on Aug. 22, 2002.

(51) Int. Cl.[7] ............................. G02B 3/00; G02B 5/30
(52) U.S. Cl. ...................................... 359/649; 359/499
(58) Field of Search ................................ 359/649–651, 359/499

(56) References Cited

U.S. PATENT DOCUMENTS

| | | |
|---|---|---|
| 3,758,201 A | 9/1973 | MacNeille |
| 4,239,329 A | 12/1980 | Matsumoto |
| 4,534,649 A | 8/1985 | Downs |
| 4,576,479 A | 3/1986 | Downs |
| 5,033,830 A | 7/1991 | Jameson |
| 5,410,375 A | 4/1995 | Fiala |
| 5,537,260 A | 7/1996 | Williamson |
| 6,081,382 A | 6/2000 | Omura |
| 6,084,708 A | 7/2000 | Schuster |
| 6,137,626 A | 10/2000 | Takaoka |

(Continued)

FOREIGN PATENT DOCUMENTS

| | | |
|---|---|---|
| DE | 101 23 725 | 11/2002 |
| DE | 101 23 727 | 11/2002 |
| DE | 101 27 320 | 12/2002 |
| DE | 101 25 487 | 1/2003 |

(Continued)

OTHER PUBLICATIONS

Burnett et al., "Intrinsic Birefringence in 157 nm Materials," Proc. 2$^{nd}$, Intl. Symp on 157 nm Lithography, 2001, pp. 1–13, International SEMATECH, Austin, Texas.

D. Krähmer, "Intrinsic Birefringence in CaF$_2$," at CaF$_2$ Birefringence Workshop, Intl SEMATECH, Jul. 18, 2001, pp. 1–9.

Morton et al., "Testing Optical Damage for 157 nm Lithography," Semiconductor International, http://www.e-insite.net/semiconductor/index.asp?layout=article&stt (Feb. 2002).

A. Hand, "157 nm Optics Demand a Bag of Tricks," Semiconductor International, http://www.e-insite.net/semiconductor/index.asp?layout=article&stt (Feb. 2001).

(Continued)

OTHER PUBLICATIONS

Primary Examiner—Scott J. Sugarman
(74) Attorney, Agent, or Firm—Pillsbury Winthrop Shaw Pittman LLP

(57) ABSTRACT

An optical system includes multiple cubic crystalline optical elements and one or more uniaxial birefringent elements in which the crystal lattices of the cubic crystalline optical elements are oriented with respect to each other to reduce the effects of intrinsic birefringence and produce a system with reduced retardance. The net retardance of the system is reduced by the cancellation of retardance contributions from the multiple cubic crystalline optical elements and the uniaxial birefringent element. The optical system may be used in a photolithography tool to pattern substrates such as semiconductor substrates and thereby produce semiconductor devices.

63 Claims, 18 Drawing Sheets

U.S. PATENT DOCUMENTS

| | | |
|---|---|---|
| 6,172,380 B1 | 1/2001 | Noguchi et al. |
| 6,195,213 B1 | 2/2001 | Omura et al. |
| 6,201,634 B1 | 3/2001 | Sakuma et al. |
| 6,252,712 B1 | 6/2001 | Fürter et al. |
| 6,259,508 B1 | 7/2001 | Shigematsu |
| 6,324,003 B1 | 11/2001 | Martin |
| 6,366,404 B1 | 4/2002 | Hiraiwa et al. |
| 6,411,384 B2 | 6/2002 | Sakuma et al. |
| 6,417,974 B1 | 7/2002 | Schuster |
| 6,455,862 B1 | 9/2002 | van der Veen et al. |
| 6,583,931 B2 | 6/2003 | Hiraiwa et al. |
| 6,672,109 B1 | 1/2004 | Hiraiwa |
| 6,683,710 B2 * | 1/2004 | Hoffman et al. ............ 359/256 |
| 6,683,729 B1 | 1/2004 | Schuster |
| 6,697,199 B2 | 2/2004 | Gerhard et al. |
| 6,728,043 B2 | 4/2004 | Gruner et al. |
| 6,775,063 B2 | 8/2004 | Shiraishi |
| 2001/0026006 A1 | 10/2001 | Noble et al. |
| 2002/0085176 A1 | 7/2002 | Hiraiwa et al. |
| 2002/0149855 A1 | 10/2002 | Schuster |
| 2002/0186355 A1 | 12/2002 | Omura |
| 2003/0000453 A1 | 1/2003 | Unno et al. |
| 2003/0007253 A1 | 1/2003 | Schuster et al. |
| 2003/0011893 A1 | 1/2003 | Shiraishi et al. |
| 2003/0012724 A1 | 1/2003 | Burnett et al. |
| 2003/0021026 A1 | 1/2003 | Allan et al. |
| 2003/0025894 A1 | 2/2003 | Owa et al. |
| 2003/0053036 A1 | 3/2003 | Fujishima et al. |
| 2003/0058421 A1 | 3/2003 | Omura et al. |
| 2003/0063393 A1 | 4/2003 | Omura |
| 2003/0067679 A1 | 4/2003 | Allan et al. |
| 2003/0086071 A1 | 5/2003 | McGuire, Jr. |
| 2003/0086156 A1 | 5/2003 | McGuire, Jr. |
| 2003/0086157 A1 | 5/2003 | McGuire, Jr. |
| 2003/0086171 A1 | 5/2003 | McGuire |
| 2003/0089299 A1 | 5/2003 | Obara et al. |
| 2003/0091934 A1 | 5/2003 | Allan et al. |
| 2003/0112501 A1 | 6/2003 | Sakuma |
| 2003/0128349 A1 | 7/2003 | Unno |
| 2003/0147061 A1 | 8/2003 | Omura |
| 2003/0168597 A1 | 9/2003 | Webb et al. |
| 2003/0197946 A1 | 10/2003 | Omura |
| 2003/0234981 A1 | 12/2003 | Hoffman et al. |
| 2004/0001244 A1 | 1/2004 | Hoffman et al. |
| 2004/0004757 A1 | 1/2004 | Schuster |
| 2004/0004771 A1 | 1/2004 | Omura |
| 2004/0005266 A1 | 1/2004 | Sakuma et al. |
| 2004/0036961 A1 | 2/2004 | McGuire, Jr. |
| 2004/0036971 A1 | 2/2004 | McGuire, Jr. |
| 2004/0105170 A1 | 6/2004 | Krahmer et al. |
| 2004/0136084 A1 | 7/2004 | Unno |

FOREIGN PATENT DOCUMENTS

| | | |
|---|---|---|
| DE | 102 10 782 | 10/2003 |
| EP | 0 828 172 | 3/1998 |
| EP | 1 063 684 A1 | 12/2000 |
| EP | 11115019 A2 | 7/2001 |
| EP | 1139138 | 10/2001 |
| JP | 2000331927 A | 11/2000 |
| JP | 2002-302628 | 10/2002 |
| JP | 2003-050349 | 2/2003 |
| WO | WO 01/01182 | 1/2001 |
| WO | WO 02/093209 A2 | 11/2002 |
| WO | WO 02/093257 | 11/2002 |
| WO | WO 02/097508 A1 | 12/2002 |
| WO | WO 02/099500 A2 | 12/2002 |
| WO | WO 09/099500 A2 | 12/2002 |
| WO | WO 03/001271 A1 | 1/2003 |
| WO | WO 03/003429 | 1/2003 |
| WO | WO 03/007046 | 1/2003 |
| WO | WO 03/009021 A1 | 1/2003 |
| WO | WO 03/009050 A1 | 1/2003 |
| WO | WO 03/009062 A1 | 1/2003 |
| WO | WO 03/046634 | 6/2003 |
| WO | WO 03/077007 | 9/2003 |
| WO | WO 03/077011 | 9/2003 |
| WO | WO 03/088330 | 10/2003 |
| WO | WO 04/008254 | 1/2004 |

OTHER PUBLICATIONS

Shiraishi et al., "Current Status of Nikon's Investigation on $CaF_2$ Intrinsic Birefringence,"International-SEMATECH Calcium Fluoride Birefringence Workshop, Jul. 18, 2001, pp. 1–15.

Burnett et al., "Intrinsic birefringence in calcium fluoride and barium fluoride," Physical Review B, vol. 64, pp. 241102-1–241102-4.

Burnett, et al., "Minimizing spatial–dispersion–induced birefringence in crystals for precision optics by using mixed crystals of materials with t opposite sign of the birefringence," National Institute of Standards and Technology, Gaithersburg, Maryland 20899, http://physics.nist.gov/Divisions/Div842/Gp3/DUVMatChar/birefring.ht (Jul. 12, 2001), pp.1–3.

Burnett et al., "Alternative Materials Development (LITJ216) Final Report—Stress Birefringence, Intrinsic Birefringence, and Index Properties of 157 nm Refractive Materials," International SEMATECH, Feb. 28, 2002, 33 pages.

J. Dyson, "Unit magnification optical system without Seidel aberrations," J. Opt. Soc. Am., vol. 49, 1959, p. 713 as described by R. Kingslake, "Lens Design Fundamentals," Institute of Optics, University of Rochester, Academic Press, Inc., 1978, pp. 320–321.

Burnett, J.H. et al., "Intrinsic Birefringence in 157 nm Materials," Proceedings of the International Symposium on 157NM Lithography, Dana Point, CA, May 15, 2001, XP002218849, pp. 1–13.

Burnett, J.H. et al., "Intrinsic Birefringence in calcium fluoride," preprinted handed out at $2^{nd}$ International Symposium on 157NM Lithography, Dana Point, CA, May 15, 2001, XP002232195, pp. 1–17.

Yeh, P. et al., "Optics of Liquid Crystal Displays," John Wiley & Sons, Inc., New York, 1999, pp. 380–385.

Burnett, et al., "Intrinsic Birefringence in Calcium Fluoride," National Institute of Standards and Technology, Gaithersburg, Maryland 20899, Submitted for Publication to Physical Review Letters (May 11, 2001), pp. 1–12.

Rudolf Kingslake, Lens Design Fundamentals, 1978, pp. 320–321, Academic Press, Inc. San Diego, California.

U.S. Provisional patent application No. 60/306,206, filed Jul. 18, 2001 which is priority document for WO 03/009050.

U.S. Provisional patent application No. 60/308,844, filed Aug. 1, 2001, in Japanese language (Owa et al).

English translation of U.S. Provisional patent application No. 60/308,844 filed Aug. 1, 2001, filed with USPTO on Oct. 23, 2002 in U.S. Appl. No. 10/207,109 (Owa et al.).

U.S. Appl. No. 10/371,266. filed Feb. 20, 2003.

U.S. Appl. No. 10/371,269, filed Feb. 20, 2003.

U.S. Appl. No. 10/759,699, filed Jan. 19, 2004.

Burnett et al., "Intrinsic Birefringence in 157 nm Materials," *National Institute of Standards and Technology*, SEMATECH Calcium Fluoride Birefringence Workshop, Jul. 18, 2001, Slides.

Burnett et al., "Intrinsic Birefringence in Calcium Fluoride and Barium Fluoride," *Rapid Communications*, Physical Review B, vol. 64, Nov. 29, 2001, pp. 241102-1–4.

Burnett et al., "Intrinsic Birefringence in 157 nm Materials," *National Institute of Standards and Technology*, Slides.

Chiba et al., "New Generation Projection Optics for ArF Lithography," *Optical Microlithography XV*, Proceedings of SPIE, vol. 4691, 2002, pp. 679–686.

Matsumoto et al., "Analysis of Imaging Performance Degradation," *Optical Microlithography XVI*, Proceedings of SPIE, vol. 5040, 2003, pp. 131–138.

Matsuyama et al., "High NA and Low Residual Aberration Projection Lens for DUV Scanner," *Optical Microlithography XV*, Proceedings of SPIE, vol. 4691, 2002, pp. 687–695.

Matsuyama et al., "Microlithographic Lens for DUV Scanner," *International Optical Design Conference 2002*, Proceedings of SPIE, vol. 4832, 2002, pp. 170–174.

Matsuyama et al., "Nikon Projection Lens Update," *Nikon Corporation*, SPIE Microlithography 5377-65, Feb. 27, 2004, Slides 1–25.

Matsuyama et al., "Nikon Projection Lens Update, "Precision Equipment Company, *Nikon Corporation*.

Miyawaki et al., "Development of 157nm Exposure Tools," *Canon*, 157nm Technical Data Review, Dec. 11–13, 2001, Slides 1–22.

Nakano et al., "The Development of 193nm–Immersion Exposure Tools," *Canon*, International Symposium on Immersion & 157nm Lithography, Aug. 3, 2004, Slides 1–25.

Nattermann et al., "Birefringence of CAF$_2$," *Schott Lithotec*, Jul. 23, 2001, Slides.

Nogawa, "Development Status of 157nm Exposure Tools," *Canon Inc.*, Semiconductor Production Equipment Development Center, Slides 1–26.

Nogawa et al., "System Design of a 157nm Scanner," *Canon Inc.*

Unno et al., "Analyses of Imaging Performance Degradation Caused by Birefringence Residual in Lens Materials," *Optical Microlithography XIV*, Proceedings of SPIE, vol. 4346, 2001, pp. 1306–1317.

Owa et al., "Nikon F2 Exposure Tool," *Nikon Corporation*, 157nm Data Review, Dec. 2001, Slides 1–24.

Owa et al., "Nikon F2 Exposure Tool," *Nikon Corporation*, 3$^{rd}$ 157nm Symposium, Sep. 4, 2002, Slides 1–25.

Shiraishi et al., "Current Status of Nikon's Investigation on CaF2 Intrinsic Birefringence," *Nikon Corporation*, International SEMATECH Calcium Fluoride Birefringence Workshop, Jul. 18, 2001, Slides 1–15.

Shiraisha et al., "Progess of Nikon's F2 Exposure Tool Development," *Optical Microlithography XV*, Proceedings of SPIE, vol. 4691, 2002, pp. 594–601.

Shiraishi et al., "Current Status of F2 Exposure Tool Development," Precision Company, *Nikon Corporation*, NGL Workshop 2003, Jul. 10, 2003, pp. P1–P29.

Suzuki et al., "Influence of the Intrinsic Birefringence in F2 Projection System," *Canon Inc.*, Calcium Fluoride Birefringence Workshop, Jul. 18, 2001, Slides.

Takahashi, "Current Status and Fututre Plan for 157nm Lithography," *Canon Inc.*, Litho Forum Los Angeles, International SEMATECH, Jan. 27–29, 2004, Slides.

Tirri et al., "Intrinsic Birefringence Impact on the ASML Wilton 157nm Lens," *ASML*, Wilton, Connecticut, Intrinsic Biref Sematech, Jul. 17, 2001, Slides 1–15.

Van Peski, "Lens Design Software CODE V© Modification," *International SeMaTech*, Jul. 18, 2001, Slides.

Walker, "Simulation of Intrinsic Birefringence of CaF$_2$ in Code V©," *Optical Research Associates*, SEMATECH Calcium Fluoride Birefringence Workshop, Jul. 18, 2001, Slides.

Wang, "157 nm Birefringence Measurement System Using PEM Technology," *Hinds Instruments*, Slides.

Ware, "Pushing ArF to the Limits!,"*Canon USA*, DNS Lithography Breakfast Forum at SEMICON West 2003, Jul. 2003, Slides.

Webb, Intrinsic Birefringence Workshop, *Corning*, Corning Tropel, Jul. 18, 2001, Slides.

Zeiss et al., "Intrinsic Birefringence in CaF$_2$," *Zeiss*, CaF$_2$ Birefringence Workshop, Slides.

"Business and Technology Update," *Canon Europa N.V.*, Amstelveen, Slides.

Memorandum from C. Van Peski to Exposure Tool Manufacturers and Lens Designers, Regarding Birefringence of Calcium Fluoride, May 7, 2001, XP-002218848.

Memorandum from C. Van Peski to PAG Members, Regarding Birefringence of Calcium Fluoride, May 7, 2001.

\* cited by examiner

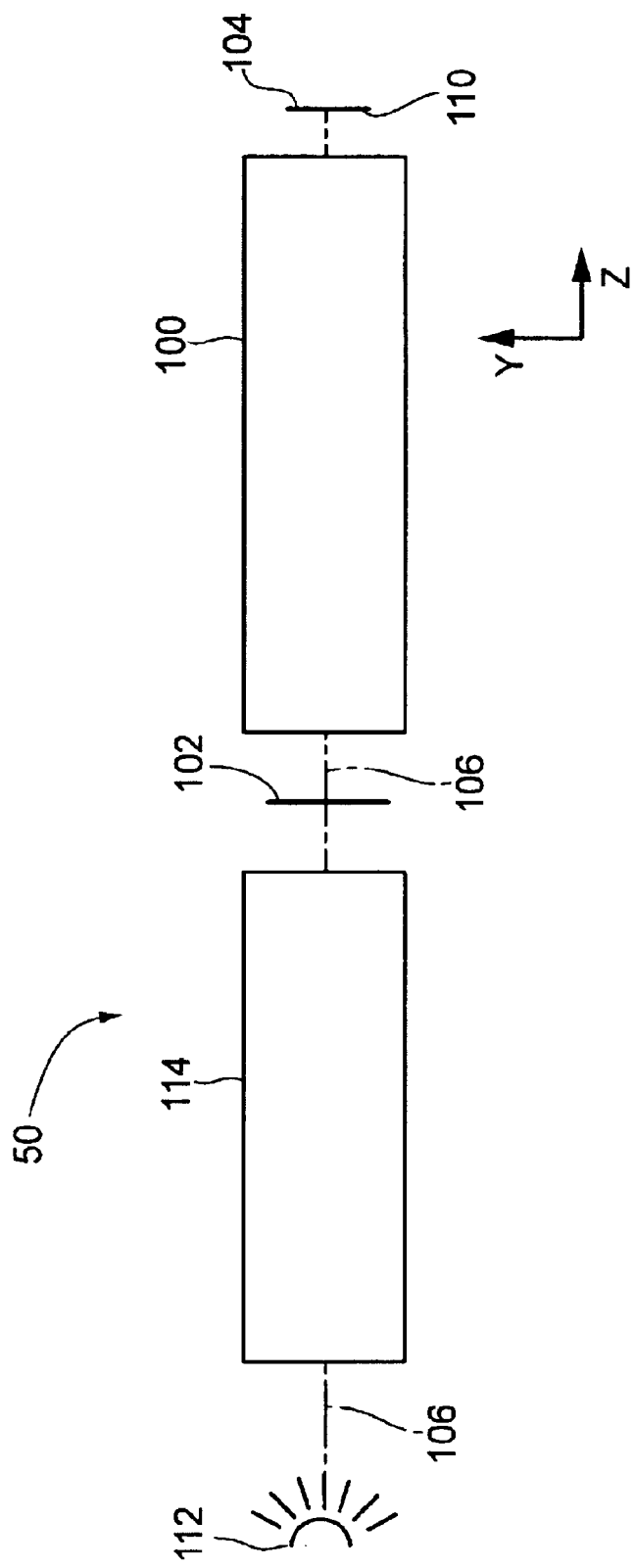

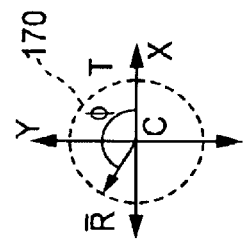
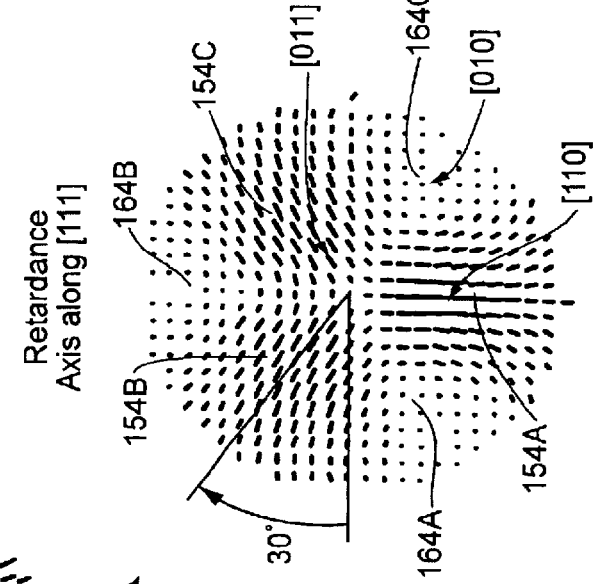
Fig. 5B
Fig. 5C
Fig. 5A

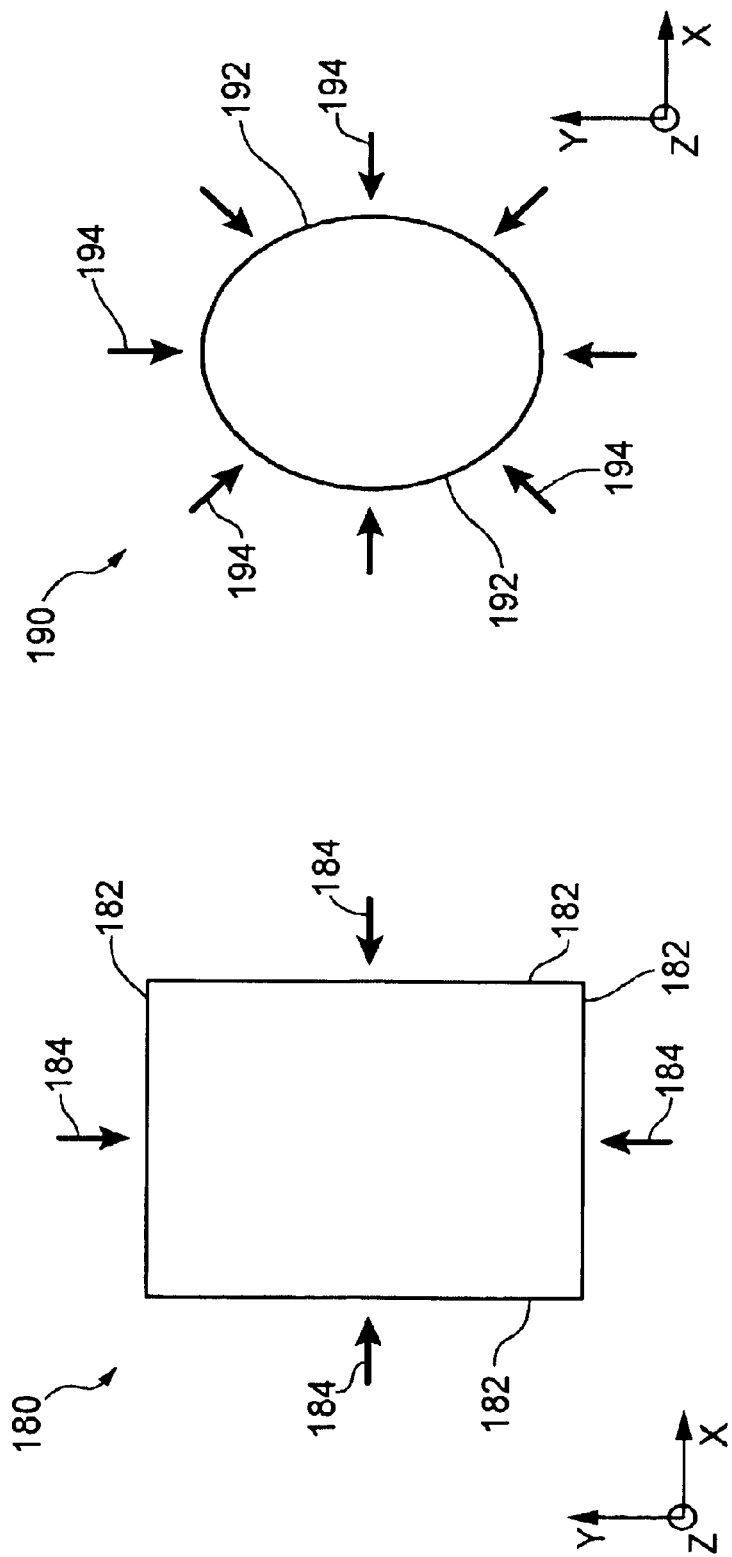

STRUCTURES AND METHODS FOR REDUCING POLARIZATION ABERRATION IN INTEGRATED CIRCUIT FABRICATION SYSTEMS

PRIORITY APPLICATION

This application claims the benefit of priority under 35 U.S.C. § 119(e) to U.S. Provisional Patent Application No. 60/432,688, filed Dec. 11, 2002 and entitled "Reduced Aberration in Optical Systems" as well as U.S. Provisional Patent Application No. 60/405,853, filed Aug. 22, 2002 and entitled "New Method of [111] Compensation Using Stress".

BACKGROUND OF THE INVENTION

1. Field of the Invention

The present invention relates to reducing aberration in optical systems. More particularly, the present invention relates to apparatus and methods for reducing polarization aberrations in optical systems such as lithographic imaging systems comprising cubic crystalline optical elements having intrinsic birefringence.

2. Description of the Related Art

In order to increase levels of device integration for integrated circuit and other semiconductor components, device features having smaller and smaller dimensions are desired. In today's rapidly advancing semiconductor manufacturing industry, the drive is to produce such reduced device features in a reliable and repeatable manner.

Optical lithography systems are commonly used to form images of device patterns upon semiconductor substrates in the fabrication process. The resolving power of such systems is proportional to the exposure wavelength; therefore, it is advantageous to use exposure wavelengths that are as short as possible. For sub-micron lithography, deep ultraviolet light having a wavelength of 248 nanometers or shorter is commonly used. Wavelengths of interest include 193 and 157 nanometers.

At ultraviolet or deep ultraviolet wavelengths, the choice of materials used to form the lenses, windows, and other optical elements of the lithography system is significant. Such optical elements preferably are substantially optically transmissive at short wavelengths used in these lithography systems.

Calcium fluoride and other cubic crystalline materials such as barium fluoride, lithium fluoride, and strontium fluoride, represent some of the materials being developed for use as optical elements for 157 nanometer lithography, for example. These single crystal fluoride materials have a desirably high transmittance compared to ordinary optical glass and can be produced with good homogeneity.

Accordingly, such cubic crystalline materials are useful as optical elements in short wavelength optical systems including but not limited to wafer steppers and other projection printers used to produce small features on substrates such as semiconductor wafers and other substrates used in the semiconductor manufacturing industry. In particular, calcium fluoride finds particular advantage in that it is an easily obtained cubic crystalline material and large high purity single crystals can be grown. These crystals, however, are expensive, and certain orientations, such as the <100> and <110> crytallographic orientations are more expensive than others, like the <111> crystal orientation.

A primary concern regarding the use of cubic crystalline materials for optical elements in deep ultraviolet lithography systems is anisotropy of refractive index inherent in cubic crystalline materials; this effect is referred to as "intrinsic birefringence." For light propagating through a birefringent material, the refractive index varies as a function of polarization and orientation of the material with respect to the propagation direction and the polarization. Accordingly, different polarization components propagate at different phase velocities and undergo different phase shifts upon passing through an optical element comprising birefringent material.

When used for construction of elements of an optical system, the birefringent properties of these cubic crystalline materials may produce wavefront aberrations that significantly degrade image resolution and introduce field distortion. These aberrations are particularly challenging for optical instruments employed in photolithography in today's semiconductor manufacturing industry where high resolution and tight overlay requirements are demanded by an emphasis on increased levels of integration and reduced feature sizes.

It has been recently reported [J. Burnett, Z. H. Levine, and E. Shipley, "Intrinsic Birefringence in 157 nm materials," Proc. $2^{nd}$ Intl. Symp. on 157 nm Lithography, Austin, Intl. SEMATECH, ed. R. Harbison, 2001] that cubic crystalline materials such as calcium fluoride, exhibit intrinsic birefringence that scales as the inverse of the square of the wavelength of light used in the optical system. The magnitude of this birefringence becomes especially significant when the optical wavelength is decreased below 250 nanometers and particularly as it approaches 100 nanometers. Of particular interest is the effect of intrinsic birefringence at the wavelength of 157 nanometers (nm), the wavelength of light produced by an $F_2$ excimer laser, which is favored in the semiconductor manufacturing industry. Strong intrinsic birefringence at this wavelength has the unfortunate effect of producing wavefront aberrations that can significantly degrade image resolution and introduce distortion of the image field, particularly for sub-micron projection lithography in semiconductor manufacturing.

Thus, there is a need to reduce these wavefront aberrations caused by intrinsic birefringence, which can degrade image resolution and cause image field distortion. Such correction is particularly desirable in projection lithography systems comprising cubic crystalline optical elements using light having wavelengths in the deep ultraviolet range.

SUMMARY OF THE INVENTION

One aspect of the invention comprises a photolithography tool comprising:
 a light source outputting light for illuminating a reticle;
 condenser optics positioned to receive light from said light source, said condenser optics positioned to direct an optical beam formed from said light through said reticle; and
 projection optics configured to form an image of said reticle onto a substrate, said projection optics including:
  one or more cubic crystalline lens elements receiving said directed optical beam propagated through said reticle, said one or more cubic crystalline lens elements having intrinsic birefringence which introduces retardance aberrations into said optical beam; and
  at least one uniaxial birefringent optical element positioned along a common optical pathway with said reticle and said one or more cubic crystalline lens elements, said uniaxial birefringent optical element comprising a uniaxial birefringent medium having a single birefringent axis, said uniaxial birefringent optical element having birefringence which introduces retardance aberrations into said optical beam that are substantial conjugate to said retardance aberrations introduced by said one or more cubic crystalline lens elements.

Another aspect of the invention comprises a method for forming a semiconductor device comprising:

propagating a beam of light through a reticle;

forming an optical image of said reticle by directing said beam of light into a first portion of a projection lens comprising a plurality of [111] cubic crystalline optical elements having respective [111] cubic crystal axes aligned with a common optical axis through said [111] cubic crystalline optical elements, said beam of light becoming aberrated as a result of first retardance aberrations introduced by said first portion of said projection lens, said first retardance aberrations resulting from variation in phase with polarization, said [111] cubic crystalline optical elements being clocked so as to cause said first retardance aberration associated with light from an on-axis field point to be substantially circularly symmetrical about said optical axis at an exit pupil of said projection lens; and propagating said beam of light through a second portion of said projection lens, said second portion of said projection lens including one or more optical elements, said second portion of said projection lens selected to introduce second retardation aberrations resulting from variation in phase with polarization, said one or more optical elements causing said second retardance aberrations associated with light from an on-axis field point that propagate through said exit pupil of said projection lens to be substantially circularly symmetric about said optical axis and to substantially counter said first polarization aberrations associated with said on-axis field point at said exit pupil, and positioning a substrate, such that said optical image formed by said beam of light output by said projection lens, is formed on said substrate.

Still another aspect of the invention comprises a semiconductor device formed according to a process comprising:

depositing a photosensitive material over a semiconductor wafer;

illuminating a mask pattern;

transmitting a beam of light along an optical path from said mask pattern through a plurality of optical elements, said optical elements having radial and tangential eigenpolarization states and said beam having first and second orthogonal polarization states each coinciding with said one of said radial and tangential eigenpolarization states such that said first polarization state is phase delay with respect to said second polarization state;

transmitting said beam of light, through at least one birefringent element having a single uniaxial birefringent axis, said at least one birefringent element having radial and tangential eigenpolarization states such that said second polarization state is phase delayed with respect to said first polarization state a substantially equal amount to reduce the relative phase difference between said first and second orthogonal polarization states of said beam of light;

receiving said beam of light after said beam of light is transmitted through said at least one birefringent element, and projecting said beam of light onto said photosensitive material over said semiconductor wafer;

removing portions of photosensitive material to form a pattern in said photosensitive material that resembles said mask pattern; and processing said semiconductor wafer having said patterned photosensitive material thereon.

Yet another aspect of the invention comprises a photolithography tool comprising:

a light source outputting light for illuminating a reticle;

condenser optics positioned to receive light from said light source, said condenser optics positioned to direct an optical beam formed from said light source through said reticle; and projection optics configured to form an image of said reticle onto a substrate, wherein said condenser optics include:

one or more cubic crystalline optical elements receiving said light from said light source, said one or more cubic crystalline optical elements having intrinsic birefringence which introduces retardance into said optical beam, and a form birefringent optical element having form birefringence, said form birefringent optical element positioned along a common optical pathway through said one or more cubic crystalline optical elements, the form birefringent optical element introducing retardance that substantially offsets said retardance imparted on said light transmitted through said one or more cubic crystalline optical elements.

Yet another aspect of the invention comprises a photolithography tool comprising:

a light source outputting light for illuminating a reticle;

condenser optics positioned to receive light from said light source, said condenser optics positioned to direct an optical beam formed from said light through said reticle; and projection optics configured to form an image of said reticle onto a substrate, said condenser optics including:

one or more cubic crystalline lens elements receiving said light from said light source, said one or more cubic crystalline lens elements having intrinsic birefringence which introduces retardance aberrations into said optical beam; and at least one uniaxial birefringent optical element comprising a uniaxial birefringent medium, said uniaxial birefringent optical element having birefringence which introduces retardance aberrations that are substantial conjugate to said retardance aberrations introduced by said one or more cubic crystalline lens elements.

BRIEF DESCRIPTION OF THE DRAWINGS

A more complete understanding of the present invention and advantages thereof may be acquired by referring to the following description, taken in conjunction with the accompanying drawings in which like reference numbers indicate like features and wherein:

FIG. 2 is a schematic diagram of an exemplary lithography system including a condenser lens and projection optics;

FIG. 5A is a graphical illustration of retardance magnitude and retardance axis orientation in angular space for a cubic crystalline material with respect to the [110] lattice direction and indicates the azimuthal orientations of the off-axis peak birefringence lobes;

FIG. 5B is a graphical illustration of retardance magnitude and retardance axis orientation in angular space for a cubic crystalline material with respect to the [100] lattice direction and indicates the azimuthal orientations of the off-axis peak birefringence lobes;

FIG. 5C is a graphical illustration of retardance magnitude and retardance axis orientation in angular space for a cubic crystalline material with respect to the [111] lattice direction and indicates the azimuthal orientations of the off-axis peak birefringence lobes;

FIGS. 6A and 6B illustrate the application of stress to an optical element to produce a uniaxial birefringent structure having a single birefringence axis substantially parallel to the optical axis of the element;

DETAILED DESCRIPTION OF THE PREFERRED EMBODIMENTS

Figure 1:
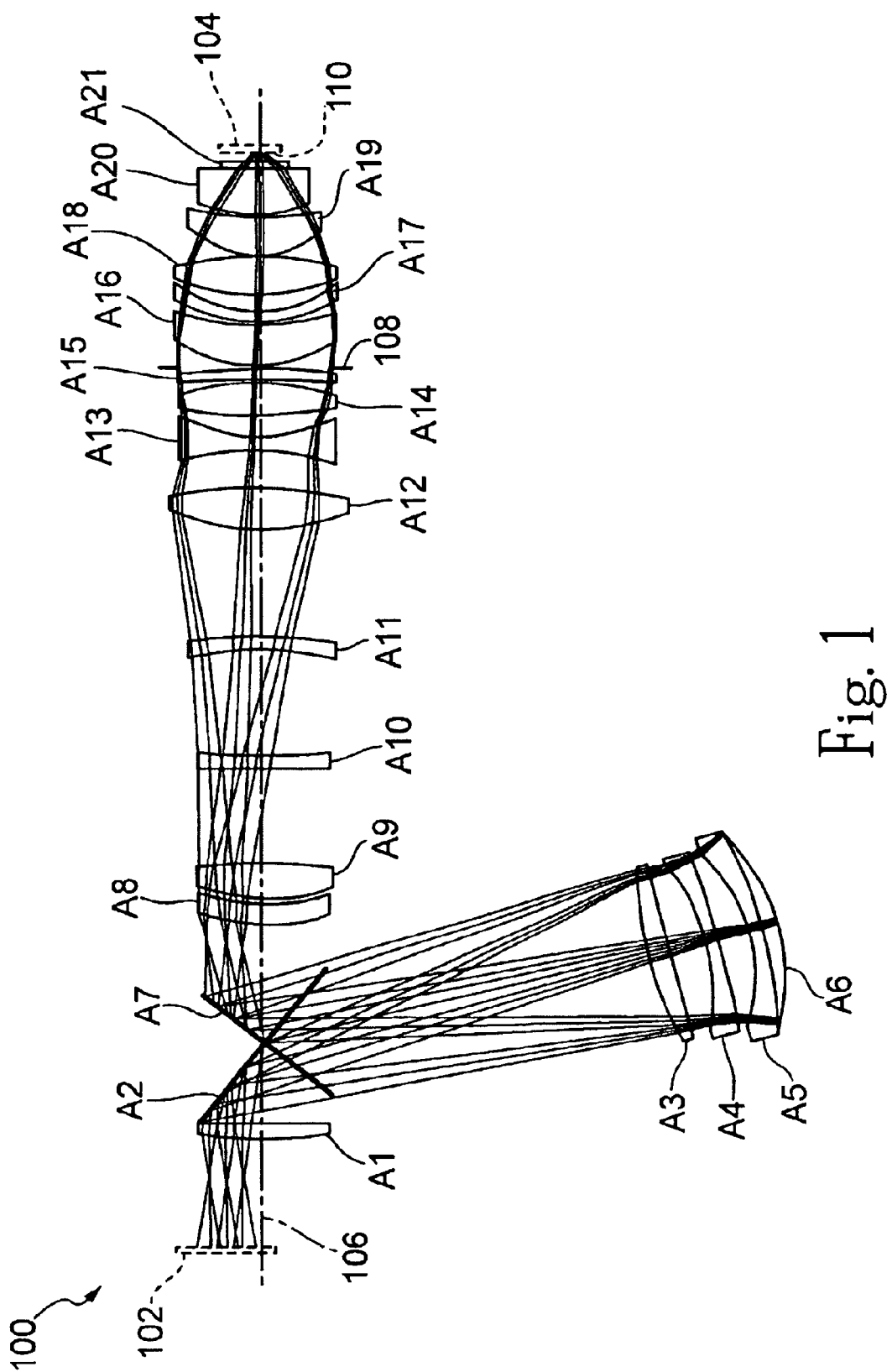
FIG. 1 is a cross-sectional view of a projection optics for an exemplary lithography system comprising twenty-one optical elements (eighteen transmissive and three reflective)

It is well-known that cubic crystalline materials like calcium fluoride are favored in lithography systems such as the high performance photolithographic tools used in the semiconductor manufacturing industry. These crystalline materials are substantially transmissive to short wavelength UV light, which provides for high optical resolution. It is also well-known, however, that these cubic crystalline materials exhibit intrinsic birefringence, i.e., an inherent anisotropy in refractive index.

Birefringence, or double-refraction, is a property of refractive materials in which the index of refraction is anisotropic, that is, the index of refraction and thus the phase velocity is different for different polarizations. For light propagating through a birefringent material, the refractive index varies as a function of polarization and orientation of the material with respect to the polarization and thus the propagation direction. Unpolarized light propagating through a birefringent material will generally separate into two beams with orthogonal polarization states. These beams may be referred to as eigenpolarization states or eigenpolarizations. The two beams propagate through the material with a different phase velocity. As the light passes through a unit length of the birefringent material, the difference in phase velocity for the two ray paths will produce a phase difference between the polarizations, which is conventionally referred to as retardance. These two states having different phase velocities may be referred to as the slow and fast eigenpolarization states.

Birefringence is a unitless quantity, although it is common practice in the lithography community to express it in units of nanometer per centimeter (nm/cm). Birefringence is a material property, while retardance is an optical delay between polarization states. The retardance for a given ray through an optical system may be expressed in nanometers (nm), or it may be expressed in terms of number of waves of a particular wavelength.

In uniaxial crystals, such as magnesium fluoride or crystal quartz, the direction through the birefringent material in which the two orthogonal polarizations travel with the same velocity is referred to as the crystal axis. The term optic axis is commonly used interchangeably with crystal axis when dealing with single crystals. In systems of lens elements, the term optical axis usually refers to the symmetry axis of the lens system. To avoid confusion, the term optical axis will be used hereinafter only to refer to the symmetry axis in a lens system.

In one simplified case, useful for conceptualizing certain properties of uniaxial crystals, the two orthogonal polarizations are linear polarization components that are directed vertically and horizontally in a plane perpendicular to the direction of propagation of the ray. In this particular example, as well as in general, the two orthogonal polarizations will travel with different velocities for directions through the material other than the crystal axis. For a given incident ray upon a birefringent medium, the two refracted rays associated with the two orthogonal polarization states are commonly described as the ordinary and extraordinary rays. The ordinary ray is polarized perpendicular to the crystal axis and refracts according to Snell's Law, and the extraordinary ray is polarized perpendicular to the ordinary ray and refracts at an angle that depends on the direction of the crystal axis relative to the incident ray and the amount of birefringence. In uniaxial crystals, the ordinary ray experiences the same index of refraction regardless of propagation direction of the ray, as by definition the ordinary ray is polarized perpendicular to the crystal axis. The polarization of the extraordinary ray is not always perpendicular to the crystal axis. Accordingly, the refractive index of the extraordinary ray depends on the propagation direction, i.e., angle, of the ray with respect to the crystal axis. For uniaxial crystals, the index of refraction of the extraordinary ray is the same for all rays that propagate at the same angle. The result is symmetry about the crystal axis as will be illustrated more fully below. For example, the difference between the ordinary and extraordinary index is constant for rays propagating at the same angle with respect to the crystal axis. Similarly, the retardance is rotationally symmetric about the crystal axis. As is well known, uniaxial crystals are commonly used for optical components such as retardation plates and polarizers.

In contrast, however, the index of refraction is generally not the same for all rays that propagate at the same angle. As a result, the retardance experienced is not rotationally symmetric about a single line. Cubic crystals have been shown to have both a retardance axis orientation and magnitude that vary depending on the propagation direction of the light with respect to the orientation of the crystal lattice. However, in contrast with a uniaxial crystal that has two propagation directions where the retardance is a maximum, i.e., the two opposite directions along the optic or crystal axis, cubic crystals may have a maximum birefringence along twelve different propagation directions through the cubic crystal.

In addition to retardance, which is the difference in the index of refraction seen by the two eigenpolarizations, in cubic crystals the average index of refraction also varies as a function of angle of incidence, which produces polarization independent phase errors.

Optical elements constructed from a cubic crystalline material, may cause a wavefront to be retarded as a result of the intrinsic birefringence of the optical element. Moreover, the retardance magnitude and orientation at a given point on the wavefront may vary, because the local propagation angle with respect to the material or the optical path length varies across the pupil. Such variations in retardance across the wavefront may be referred to as "retardance aberrations." Retardance aberrations split a uniformly polarized or unpolarized wavefront into two wavefronts with orthogonal polarizations. Again, these orthogonal wavefronts correspond to the eigenpolarization states. Each of the orthogonal wavefronts will experience a different refractive index, resulting in different wavefront aberrations.

Optical elements comprising cubic crystalline material therefore introduce additional aberrations that are correlated with polarization. These aberrations are generally referred to herein as polarization aberrations and include the retardance aberrations described above which result from intrinsic birefringence in cubic crystalline materials. Additionally, these polarization aberrations include diattenuation, the variation in optical transmission with polarization.

In cubic crystalline material, these polarization aberrations are significant enough to affect image quality in optical systems such as photolithography system used in semiconductor fabrication processing. Accordingly, methods and apparatus for reducing these aberrations have significant value.

For ease of description, the cubic crystalline materials have crystal axis directions and planes described herein using the well-known Miller indices, which are integers with no common factors and that are inversely proportional to the intercepts of the crystal planes along the crystal axes. Lattice planes are given by the Miller indices in parentheses, e.g. (100), and axis directions in the direct lattice are given in square brackets, e.g. [111]. The crystal lattice direction, e.g. [111], may also be referred to as the [111] crystal axis of the material or optical element. The (100), (010), and (001) planes are equivalent in a cubic crystal and are collectively referred to as the {100} planes.

As discussed above, for cubic crystalline materials, the magnitude of retardance depends on the direction of light propagation through the crystal with respect to the orientation of the crystal axes and the optical path length within the birefringent medium. For example, light propagating through an exemplary cubic crystalline optical element along the [110] crystal axis experiences the maximum retardance, while light propagating along the [100] crystal axis experiences no retardance.

Unfortunately, when constructing optical systems from cubic crystalline materials such as calcium fluoride, the cost of the optical elements contributes significantly to the total cost of these optical systems. In particular, the expense of the materials used to fabricate the refractive optical elements drives up the cost. Moreover, optical elements comprising calcium fluoride having an optical axis directed along the [100] crystalline directions, which has the least retardance, is the most expensive to fabricate. Blanks for creating refractive elements having an optical axis corresponding to [110] are also expensive. In contrast, calcium fluoride grown (or cleaved) in the [111] direction is significantly less expensive to fabricate. However, as described above, optical elements having an optical axis generally coinciding with the [111] direction of the crystalline material although least expensive, possess intrinsic birefringence which introduces wavefront aberrations that degrade performance of optical systems such as image quality and resolution. Although both [100] and [111] optical elements have zero retardance along their respective optical axes, for [100] optical elements, the retardance increases more slowly for rays further and further off-axis.

FIG. 1 is a schematic illustration of a projection optics section 100 of an exemplary lithography system. The optical system 100 shown in FIG. 1 is substantially similar to the optical system shown and described in European Patent Application No. 1 115 019 A2 by D. Shafer et al. This exemplary optical system 100 is a large format catadioptric projection lens having an NA of 0.8, designed for a wavelength of 157.63 nm and which provides a 5× reduction. Such an optical system 100 is intended to be exemplary only and other optical imaging systems and non-imaging systems may be used in other embodiments. The optical system 100, however, may be the projection optics section of a lithography tool in one preferred embodiment. As shown in FIG. 1, the projection lens 100 is disposed between a reticle 102 and a substrate 104. The reticle 102 may be considered to correspond to the object field with the substrate 104 in the image field of the projection lens 100.

The optical system 100 shown is a lens system, commonly referred to collectively as a "lens," comprising a plurality of, i.e., twenty-one, individual optical elements A1–A21, an optical axis 106, and aperture stop (AS) 108. The reticle 102 includes a mask pattern, which is to be projected onto a surface 110 of the substrate 104. Substrate 104 may, for example, be a semiconductor wafer used in the semiconductor manufacturing industry, and surface 110 may be coated with a photosensitive material, such as a photoresist commonly used in the semiconductor manufacturing industry. Other substrates may be used according to other embodiments and applications. Reticle 102 may be a photomask suitable for various microlithography tools. Generally speaking, the reticle or photomask, hereinafter referred to collectively as reticle 102, includes a pattern in the object field. The pattern may for example be clear and opaque sections, gray scale sections, clear sections with different phase shifts, or a combination of the above. Light is propagated through the pattern, and the pattern is projected through the lens system 100 and onto surface 110 of substrate 104. The pattern projected from the reticle 102 onto substrate surface 110 may be uniformly reduced in size to various degrees such as 5:1, 4:1 or others. The optical system 100 may have a numerical aperture, NA, of 0.8, but is not so limited. Systems having other numerical apertures, such as for example between about 0.60 to 0.90 or beyond this range are conceivable.

The arrangement of the plurality of elements A1–A21, is intended to be exemplary only and various other arrangements of individual lens elements having various shapes and sizes and comprising different materials may be used according to other exemplary embodiments. The element thicknesses, spacings, radii of curvature, aspheric coefficients, and the like, are considered to be the lens prescription. This lens prescription is not limited and will vary with application, performance requirements, cost, and other design considerations.

The optical system 100 shown in FIG. 1, includes seventeen lens elements A1, A3–A5, A8–A20 as well as a window A21. These eighteen optical elements A1, A3–A5, A8–A21 are substantially optically transmissive at the wavelength of operation, i.e., for example to wavelengths of 157 nanometers. The optical system 100 further includes three reflective optical elements A2, A6, and A7, one of which is curved and has power (A6). More or less optical elements may be included in other designs. In other embodiments, these elements may be powered or unpowered, refractive, reflective, or diffractive and may be coated or uncoated. The individual optical elements, A1–A21, are arranged along the common optical axis 106 that extends through the lens 100.

In the case where the optical system 100 comprises a plurality of individual lens elements A1, A3–A5, A8–A20, or other optically transmissive components, preferably one or more comprises cubic crystalline material. Cubic crystalline materials such as for example single crystal fluoride materials like strontium fluoride, barium fluoride, lithium fluoride, and calcium fluoride may be used. As discussed above, calcium fluoride is one preferred material for operation with ultraviolet (UV) light. In an exemplary embodiment, most or even all of the cubic crystalline optical elements are formed of the same cubic crystalline material. This cubic crystalline material may also have the same crystallographic orientation with respect to the optical axis of the lens 100. In one preferred embodiment, a majority of the lens elements comprise cubic crystal such as cubic crystal calcium fluoride having a <111> crystal axis substantially aligned with the optical axis, as these crystals are less expensive than other crystallographic directions. In one embodiment, all of the lens or powered optical elements comprise <111> crystal. Non-powered transmissive optical elements, for example, windows A21, if any, may also comprise <111> crystal. The lens 100 may also include substantially transmissive optical elements, which are formed of non-cubic crystalline material such as low-OH fused silica, also known as dry fused silica.

FIG. 2 is a schematic illustration showing the optical system 100 functioning as the projection optics section within a larger lithography tool 50. FIG. 2 shows an optical source 112 and the substrate 104. The reticle 102 is disposed between condenser optics 114 and projection optics 100. The optical field of reticle 102 may be of various dimensions. Each of the projection optics 100 and condenser optics 114 may include an aperture stop and a plurality of lens elements, windows, and/or other refractive, reflective, catadioptric, and diffractive members. The lithography tool 50 shown in FIG. 2 is aligned along the optical axis 106. This lithography tool 50 may be a wafer stepper, projection printer, or other photolithography or microlithography tool used in the semiconductor industry. The lithography tool 50 may likewise be a scanning optical system, a step-and-repeat optical system or other microlithography or projection optics system. In a scanning-type optical system, a pattern on reticle 102 is projected and scanned onto corresponding sections of surface 110 of substrate 104. In a step-and-repeat optical system, such as a conventional wafer stepper, the pattern on reticle 102, is projected onto multiple different portions of surface 110 in a plurality of discrete operations. In either case, the reticle pattern includes various field points which are projected onto surface 110 simultaneously.

The pattern printed on reticle 102 may be used to create a circuit pattern on surface 110 for an integrated circuit device being fabricated on the substrate 104. The pattern may be projected onto a photosensitive material formed on the surface 110 to create an exposure pattern. The exposure pattern may be developed using conventional means, to produce a photo-pattern in the photosensitive material. The photo-pattern may be translated into the substrate 104 by etching or other method. A plurality of layers of materials can be deposited thereon. The surface 110 may be one of the layers and the photo-pattern formed on the layer. Etching or other techniques may be used to translate the photo-pattern into the layer. Similarly-formed photo-patterns may be used to enable spatially selective doping using known methods such as ion implantation. In this manner, multiple photolithographic operations, may be used to form various patterns in various layers to create a completed semiconductor device such as an integrated circuit. An advantage of the innovative techniques described herein is that images formed on the substrate 104 have sufficiently low aberration to enable precisely dimensioned and aligned device features to be created having reduced sizes.

In one exemplary scanning optical system, the optical field of the reticle 102 which is projected and scanned onto the substrate surface 110 has a height of few centimeters and a width of a few millimeters. Other field dimensions may be used which are suitable for the specific applications and may depend on the type of lithography tool in which the projection optics are included. Similarly, the format at the image plane where the wafer is located may vary as well.

The optical source 112 produces light that is subsequently shaped and conditioned by condenser lens 114. The optical wavelength of source 112 may vary, and may be no greater than 248 nanometers in some cases. In one preferred embodiment, light having a wavelength of about 157 nanometers may be used. The optical source 112 may produce linearly polarized light. One optical source that produces linearly polarized light is an excimer laser. In other embodiments, the optical source 112 may produce light having other polarizations or which is substantially non-polarized. A KrF excimer laser operating at about 248 nm, an ArF excimer laser operating at about 193 nm, or a $F_2$ excimer laser operating at about 157 nm, are examples of various optical sources 112.

The light produced by the optical source 112 is shaped and conditioned by the condenser lens 114 and propagated through the reticle 102 and the projection optics 100 to project an image of the reticle 102 or photomask onto the substrate 110. This light may be described as a light beam comprised of a plurality of rays. In accordance with convention, the marginal ray is the ray from the point on the object field 102 intersecting the optical axis 106, to the edge of the aperture 108 and also intersects the axis 106 at the image field 104. The chief ray is the ray from a given field point that passes through the center of the aperture stop 108 and system pupils in the optical system 100. For an object field point located where the optical axis 106 intersects the reticle 102, the chief ray travels along the optical axis 106. Light rays emanating from an individual object field point on the reticle or photomask 102 correspond to a wavefront that is propagated through the projection lens 100 and are ideally focused down to a corresponding image field point at the substrate 104. The full image field is therefore generated by a plurality image field points with corresponding wavefronts associated therewith.

Figure 3B:
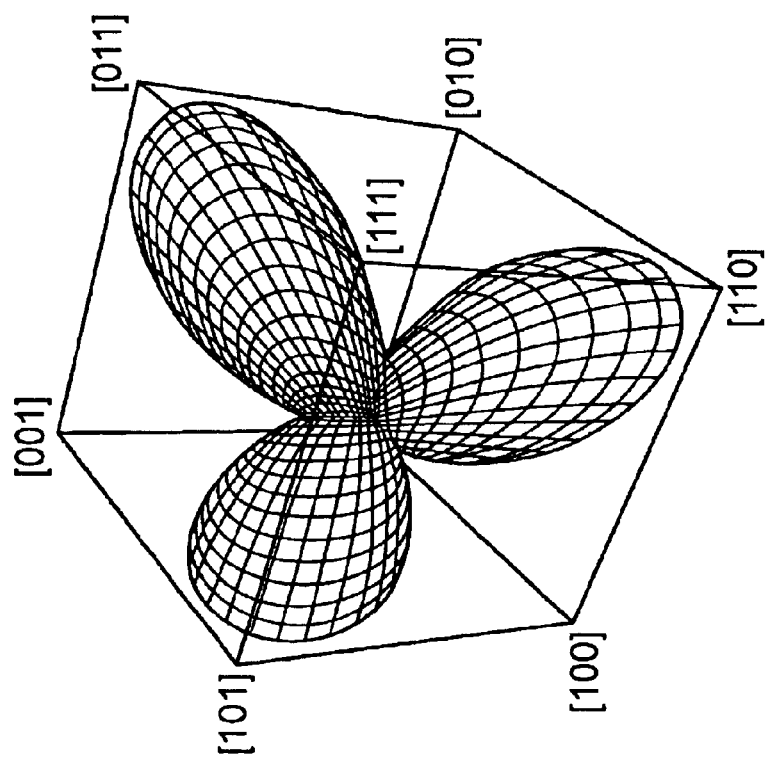
FIG. 3B is a graphical representation of variation of birefringence magnitude with respect to a cubic crystal lattice.
Figure 3A:
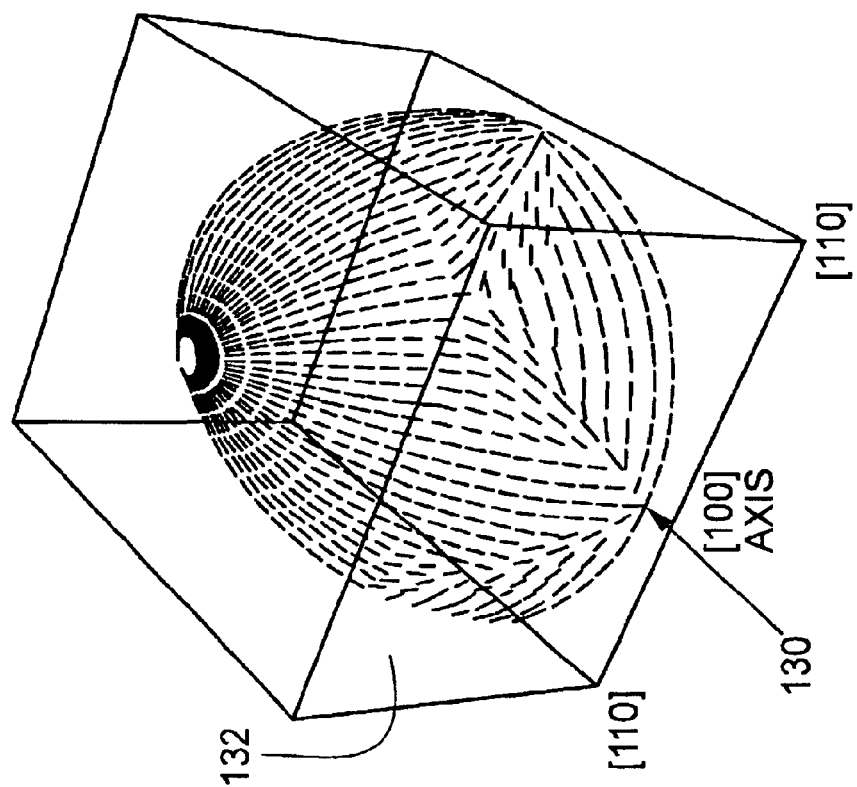
FIG. 3A is a graphical representation of variation of birefringence axis orientation with respect to a cubic crystal lattice.

As described above, these wavefronts may be aberrated as a result of retardance, which has magnitude and orientation that varies with direction in cubic crystalline materials, as a result of intrinsic birefringence. FIG. 3A is a three-dimensional vector plot showing the spatial variation in retardance axis orientation within a material having a cubic crystalline lattice. The cubic crystalline lattice may be that of calcium fluoride, for example. The crystal axis directions shown in FIG. 3A as well as in FIG. 3B are described using Miller indices. FIG. 3B is a three-dimensional plot corresponding to a quadrant of the vector plot shown in FIG. 3A, and depicts the corresponding magnitude of the retardance from a cubic crystal. It can be seen that the localized magnitude and axis of the retardance vary spatially throughout the crystal in a known fashion. It can also be seen that, depending on the direction along which light travels through such a cubic crystalline material, the retardance magnitude and the orientation of the retardance axis relative to the direction of propagation will vary. FIG. 3B represents an octant of the crystal lattice; the extension of this diagram to all possible directions through the crystal gives twelve directions with maximum retardance, herein referred to as retardance lobes.

The crystalline material can therefore be advantageously cut along a given plane and arranged such that light normal to that plane travels along a chosen axis direction. For example, light traveling along the [100] crystal axis 130 (i.e. along the [100] crystal lattice direction), which is oriented normal to the (100) crystal lattice plane 132, sees a fixed and deterministic localized retardance. The retardance magnitude and retardance axis direction encountered by a given ray therefore varies as a function of the direction along which the light ray travels through the crystal.

Figure 4:
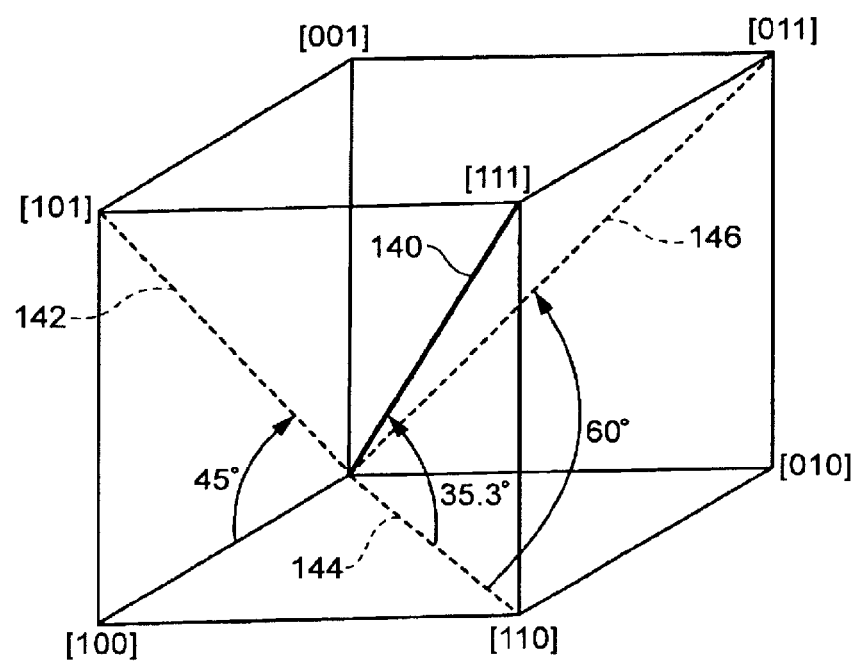
FIG. 4 is a perspective view showing angular relationships between various directions through an exemplary cubic crystalline lattice.

FIG. 4 is a perspective view showing angular relationships between various directions through an exemplary cubic crystalline lattice. The cubic crystalline lattice may be that of calcium fluoride, for example. FIG. 4 includes the peak retardance directions along the [101], [110], and [011] lattice directions, indicated by lines 142, 144, and 146, respectively. Line 140 represents the [111] crystal axis direction, which corresponds to a direction through the crystal with no retardance.

FIGS. 5A, 5B, and 5C are schematic representations of the variations in retardance magnitude per unit length in the crystal and retardance axis orientation in angular space for optical axis 106 orientations in the [110], [100], and [111] lattice directions, respectively, for the cubic crystalline lattice structure shown in FIG. 4. The total retardance through a crystal is the product of the retardance per unit length for a given ray and the path length. The center of the plot represents the retardance encountered by a ray traveling along the indicated crystal axis and normal to the plane of the illustration. Retardance depicted at increased radial distance from the center represents the retardance for rays at increased angles of propagation with respect to the optical axis 106. These plots, therefore can be used to visualize the retardance encountered from a plurality of rays emanating from a point, e.g. on the optical axis 106 through a lens element comprising for example [111] material. The ray through the optical axis 106 propagates in the [111] direction through the center of the lens element and encounters a retardance with magnitude and orientation specified at the center of the plot. A ray emanating from the point on the axis but angled will experience retardance specified by the direction indicated on these plots. In each of FIGS. 5A–5C, the localized retardance axis is indicated by the direction of lines plotted on a square grid, and the magnitude is indicated by the relative length of the lines.

The variation of retardance magnitude in FIGS. 5A–5C is characterized by several lobes, also referred to as nodes, distributed azimuthally in which the retardance is maximized. Each of FIGS. 5A–5C shows peak retardance lobes with respect to the various crystal axis directions in the cubic crystalline lattice shown in FIG. 4. The spatial orientation of the cubic crystalline lattice is indicated by the other related crystalline lattice directions indicated by the arrows. For example, in FIG. 5A in which the center represents retardance encountered by a ray traveling along the [110] crystal axis, a ray traveling along the [101] lattice direction is at a greater angle with respect to the [110] crystal axis than a ray traveling along the [111] lattice direction; these ray angles are at 60° and 35.3°, respectively. This is indicated by the [101] arrowhead positioned at a greater radial distance from center than the [111] arrowhead. The relative azimuthal directions of the indicated [100], [101], and [111] lattice directions are as shown in FIG. 4. This description applies to FIGS. 5B and 5C as well.

Referring to FIGS. 5A–5C, in each case, the indicated crystal axis is the direction normal to the plane of the paper and at the center of each of the respective figures. FIG. 5A shows retardance with respect to the [110] lattice direction, including peak retardance lobes 150A, 150B, 150C and 150D, each which forms an angle of 60° with respect to the [110] crystal axis direction. [110] retardance also includes a central retardance node. FIG. 5B shows retardance with respect to the [100] lattice direction, including peak retardance lobes 152A, 152B, 152C and 152D each of which forms a 45° angle with respect to the [100] crystal axis direction. Near the [100] axis, the retardance exhibits a substantial circular symmetry with redardance axis oriented tangentially about the [100] axis. There are also peaks along the diagonals at 90° not depicted. FIG. 5C shows retardance along the [111] lattice direction. The [111] cubic crystal exhibits a complex substantially three-fold retardance symmetry near the [111] axis. This retardance plot includes peak retardance lobes 154A, 154B, and 154C, each of which forms an angle of 35.3° with respect to the [111] crystal lattice direction.

The crystal lattice and resulting retardance lobes with respect to the crystal axes such as shown in FIGS. 5A–5C, correspond to the exemplary case in which the cubic crystals are negative cubic crystals; that is the ordinary refractive index is greater than the extraordinary index, so the birefringence, $n_e-n_o$, is negative. Calcium fluoride is an example of a negative cubic crystal. For positive cubic crystals, the patterns would be substantially similar except the lines would be each rotated by 90 degrees about their midpoints. It should be understood that other cubic crystalline optical elements such as barium fluoride, lithium fluoride, and strontium fluoride as well as other materials might be used to form optical elements. With respect to any cubic crystalline material used, the variations in the retardance direction and magnitude can be measured, or calculated using computer modeling. Furthermore, the variations in retardance direction and magnitude of an optical material may also be measured. Graphical representations of the variations in retardance magnitude and axis orientations similar to those shown in FIGS. 5A–5C can be similarly generated for each of the aforementioned cubic crystalline materials.

Referring again to FIG. 1, it can be understood that each of the individual transmissive optical elements A1, A3–A5, and A8–A21 may be formed of the same cubic crystalline optical material such as calcium fluoride. Moreover, these optical elements may be formed from cubic crystal having the same crystal orientation, e.g., [110], [100], or [111] cubic crystal, and may be arranged with substantially the same lattice orientation aligned with the optical axis 106. For example, the optical elements A1, A3–A5, and A8–A21 may be oriented such that their [110] axes are aligned substantially parallel to the optical axis 106. In this case then, the net retardance of the lens system 100 will have a retardance that varies across the system exit pupil in a similar manner to the angular retardance variation shown schematically in FIG. 5A. Similarly, if all the optical elements A1, A3–A5, and A8–A21 are aligned with their [100] axes substantially parallel to the optical axis 106, then the net retardance of the lens system 100 will have a retardance that varies across the system exit pupil in a similar manner to the angular retardance variation shown schematically in FIG. 5B.

Likewise, if all the optical elements A1, A3–A5, and A8–A21 are aligned with their [111] axes substantially parallel to the optical axis 106 then the net retardance of the lens system 100 will have a retardance that varies across the system exit pupil in a similar manner to the angular retardance variation depicted schematically in FIG. 5C. Accordingly, for a lens 100 comprising a plurality of [111] optical elements with the respective [111] crystal directions aligned substantially along the optical axis 106, the retardance distribution includes peak retardance lobes 154A, 154B, and 154C, each of which forms an angle of 35.3° with respect to the [111] crystal lattice direction. Also as illustrated in FIG. 5C, a large portion of the local retardance axes within these lobes 154A, 154B, and 154C are oriented substantially radially away from the [111] axis. An inset to FIG. 5C depicts an exemplary radial direction represented by a vector $\vec{R}$ extending from a center point, C. This centerpoint, C, is coincident with the optical axis 106, (i.e. the Z axis) which is shown in the inset at the intersection of X and Y axes.

Located between these retardance lobes 154A, 154B, 154C are sections 164A, 164B, 164C corresponding to generally lower retardance than within the lobes. As shown, the retardance axes in these sections 164A, 164B, 164C, are not substantially radially directed, i.e. oriented in a radial direction away from the optical axis 106, as are the retardance axes found in the lobes 154A, 154B, and 154C. Accordingly, for many lenses 100 comprising a plurality of [111] optical elements with the respective [111] crystal directions aligned substantially identically along the optical axis, the retardance oscillates between high and low values in the tangential direction, T, that is along circular paths 170 centered about the optical axis 106 as depicted in the inset. Thus, sampling the distribution of rays passing through the exit pupil by sweeping azimuthally 360 degrees about the optical axis 106, which corresponds to the angular direction φ, the magnitude of the retardance may increase and decrease. In addition, the retardance axes are oriented more in a radial direction in the peak regions 154A, 154B, and 154C, than in the sections 164A, 164B, 164C between these lobes, especially at positions in the pupil farther from the optical axis 106. For numerical apertures greater than about 0.5, this non-circularly symmetric effect will likely be present. With smaller numerical apertures, and likewise smaller aperture stops and entrance and exit pupils, a level of circular symmetry may be discernable. However, for large apertures and pupils and larger bundles of rays, defined by larger f-numbers and numerical apertures, the observed pattern are more likely to be non-circularly symmetric.

As described below, the local retardance axes in retardance patterns presented herein describe local retardance effects experienced by a bundle of rays propagating though one or more optical elements. This bundle of rays may for example extend as a cone from a point on-axis. The expanse of this cone of rays may be defined by a solid angle or numerical aperture. Different rays of light in this cone will be incident on the optical element or elements at different locations. Similarly, these different rays will also be located at different positions in the aperture or pupils associated with the optical element or plurality of optical elements. Moreover, these different rays of light will be incident on the optical element(s) at different vertical and horizontal angles and have different path lengths through the optical elements. The variation in vertical and horizontal angle and optical path length results in different retardance which may be characterized by the retardance patterns or retardance distributions mapped across a selected region such as a reference plane or reference sphere. The retardance pattern may, for example, be mapped at the exit pupil. These local retardance axes are therefore constructs used to characterize the retardance encountered by a ray of light passing through a specific location in the pupil. Retardance patterns correspond to distributions of the retardance experienced by a plurality of rays of light at, for example, a reference sphere at the pupil. Another construct useful for characterizing the retardance of an optical system 100 are the eigenpolarization states as discussed more fully below.

The actual retardance experienced by this bundle of rays propagating through the optical system 100 will depend on the optical properties of the elements as determined, for example, by their shapes, thicknesses, and separations, etc. In addition, the retardance pattern may be affected by the field angle. In the discussion above with respect to FIG. 5C, wherein the optical axis 106 is aligned with the [111] direction, the bundle of rays was assumed to pass through on-axis image and object points.

Other configurations, however, are possible. In various preferred embodiments described herein, one or more of the optical elements A1, A3–A5, and A8–A21 are rotated about the optical axis 106 to alter the retardance distribution. The process of generally rotating one or more of the transmissive optical elements A1, A3–A5, and A8–A21 about the optical axis 106 is referred to as clocking.

In various preferred embodiments described herein, [111] cubic crystal optical elements are clocked to provide more uniform retardance characteristics for rays propagating through the lens system 100. Preferably, this azimuthal rotation in the ±φ direction, causes the regions 154A, 154B, 154C and 164A, 164B, and 164C associated with the optical elements A1, A3–A5, and A8–A21 to overlap and merge, forming a more homogeneous retardance distribution. For example, one or more of the optical elements A1, A3–A5, and A8–A21 may be rotated clockwise or counter-clockwise such that the lobes 154A, 154B, 154C associated with the rotated elements are superimposed on the sections 164A, 164B, 164C between the lobes 154A, 154B, 154C of other elements. Contributions of retardance at the lobes 154A, 154B, 154C can be introduced into sections 164A, 164B, 164C between lobes. As a consequence, the differences between the retardance lobes 154A, 154B, and 154C and sections 164A, 164B, 164C there between is reduced. The result in a more uniform, less varied, distribution of retardance, both in amplitude and orientation. Accordingly, the three retardance peaks 154A, 154B, and 154C shown in FIG. 5C are not as pronounced or are more preferably substantially removed. Variation along concentric circular paths about the optic axis 106 is preferably reduced. In addition to decreasing change in magnitude of retardance, the retardance axes are preferably more radially directed as a result of the rotations. The radially directed retardance axis in the lobes 154A, 154B, 154C is preferably introduced into the sections between the lobes 164A, 164B, and 164C as the optical elements A1, A3–A5, and A8–A21 are rotated to provide overlap of the two types of regions associated with separate optical elements. The result, is preferably a lens system 100 having a retardance pattern, for example, in the exit pupil plane, having substantially radially directed retardance axes extending in each radial direction about the optical axis 106.

The contributions of the retardance in the lobes 154A, 154B, 154C preferably provides a more circularly symmetric retardance pattern having more radially oriented retardance axes as measured for example at the exit pupil of a lens system 100 having numerical aperture of greater than about 0.5. More preferably, such retardance characteristics are achievable for lens systems 100 having numerical apertures of greater than about 0.75 or 0.85. Substantially circularly symmetric retardance patterns at the exit pupil of the lens 100 at least for on-axis fields angles is preferably obtained for a first portion of the optical elements in the lens 100.

In various embodiments, the retardance as measured at the pupil is preferably about 50, 75, or 90 percent or more circularly symmetric about the optical axis 106 for on-axis field points. Moreover, the circular symmetry is such that the magnitude of retardance varies less than about 30%, and more preferably less than about 20% or 10%, around a circular path about the optical axis 106 for axial field points. In addition, more than about 70%, and more preferably greater than about 80 or 90%, of the local birefringene axes are substantially radially directed around circular paths about the optical axis 106 in the used clear aperture at least for on-axis field points. The RMS retardance, however, resulting from this first portion, which preferably comprises [111] cubic crystalline optical elements, may be at least about 0.1 RMS wave, 0.5 RMS waves or higher for numerical apertures of about 0.5 to 0.7 or higher. Systems having lower retardance, for example, about 0.01 RMS or lower, are also possible. These values may apply to on-axis fields.

To reduce the net retardance of the lens 100, this first portion of the lens 100 is included together with a second portion comprising one or more additional optical element that possesses a conjugate retardance pattern. The retardance of the second portion preferably at least partially cancels the retardance effects contributed by of the first portion. The result is a reduced net retardance for the lens system 100.

Accordingly, the optical element or elements in the second portion preferably impart a retardance as measured for example at the exit pupil that is substantially circularly symmetric about the optical axis 106. These element(s) also preferably have retardance orthogonal to the radially directed retardance associated with the optical elements in the first portion of the lens system 100. The local retardance axes of the second portion of the lens 100 is therefore preferably tangentially directed, i.e., the local retardance axes preferably are substantially oriented along or tangential to concentric circular paths 170 centered about the optical axis 106. The tangential retardance of the second portion is substantially orthogonal and opposite to the radial retardance pattern associated with the first portion of the lens 100 and thus the two at least partially cancel or offset each other.

Such compensation is preferably provided for optical systems 100 having numerical apertures greater than about a 0.5 numerical aperture. The contributions of the two portions to the net retardance, for example, at the exit pupil is preferable substantially similar in magnitude yet opposite at least for on-axis field points so as to counter each other. Preferably, however, sufficient correction is provided for off-axis field points as well.

In various preferred embodiments, the result is preferably wavefront correction to a level of a few waves across the used clear aperture. Similarly, the retardance induced phase variation is between about 0.1 to 1% or less across the beam.

A tangential retardance pattern suitable for use in the second portion of the lens 100 may be provided by a negative uniaxial crystal. Various negative uniaxial crystals have substantially circularly symmetric retardance distributions with local retardance axes directed radially from a central region. Such negative uniaxial crystals, however, are generally not substantially optically transmissive to UV wavelengths equal to or less than for example about 248 nanometers, 193 nanometers, or 157 nanometers.

A tangential retardance pattern may also be provided by an optical element comprising a uniaxial birefringent medium, i.e., a medium having a single real birefringent axis or optic axis associated with the medium. Preferably, this uniaxial birefringent axis is aligned substantially parallel to the optical axis 106 through the birefringent medium such that a tangentially directed birefringent pattern in produced.

The localized retardance axes distributed across the designated reference plane or sphere such as a pupil or aperture are different from the physical birefringence axis associated with an optically transmissive material or medium. The local retardance axes describe the affect of the physical birefringence axis or axes associated with the material or medium used to form the optical element or elements on a plurality of rays propagating through the optical system 100. Accordingly, the localized retardance axes and more broadly the retardance patterns vary with the numerical aperture and the field angle. Additionally, in contrast with the real birefringence axis or axes of a birefringent material or medium, the localized retardance axes, may vary with the prescription of the lens 100. The birefringence axis or axes are material properties, which create variations in retardance, retardance patterns, or retardance distributions in a lens system.

The geometry of an optical element comprising a uniaxial medium with a single birefringent axis aligned along the optical axis 106 produces a tangential retardance pattern. Namely, this pattern includes localized retardance axes, e.g., at the exit pupil, that are tangential to concentric circular paths 170 centered about the optical axis 106. Accordingly, a uniaxial birefringent medium is a suitable candidate for the optical element or elements in the second portion of the lens 100. Elements comprising this uniaxial birefringent medium in the second portion may offset the birefringence and retardance associated with the first portion of the lens system 100 described above as having a radial directed retardance distribution.

A uniaxial medium can be provided by applying stress to an optical element as shown in FIGS. 6A and 6B. Stressing a flat rectangular plate 180 having front and rear planar surfaces on its four sides or edges 182 can create a substantially uniform stress distribution across the planar surfaces. Accordingly, the magnitude of the birefringence will be substantially the same across the rectangular spatial extent of the plate 180. In FIG. 6A, the applied stress is represented by arrows 184. Preferably, the stress is applied uniformly, i.e., the amount of stress applied in each direction is substantially the same, although other designs are possible. The refractive index will vary as in a uniaxial crystal, which has a single optic or birefringence axis. Similarly, the stressed flat rectangular plate 180 has a single birefringence axis and is a uniaxial birefringent medium. This single birefringence axis is normal to the plane of the applied stress, i.e., in the Z direction which is normal to the X-Y plane. Accordingly, light propagating along the birefringence axis (i.e., parallel to the Z axis) is not retarded as the electric fields are in the X-Y plane. In contrast, maximum retardance is produced for light propagating in the applied stress plane, i.e., in the X-Y plane, which has orthogonal polarizations parallel and perpendicular to the birefringence axis.

The plate 180 itself may comprise, for example, cubic crystal such as cubic crystalline calcium fluoride as well as other materials. For a uniaxial birefringent plate constructed by applying stress to a cubic crystalline substrate, the stress birefringence coefficient is highest when the [100] crystal lattice direction is oriented along the system optical axis 106. The stress birefringence coefficient along the [100] direction is over 4 times larger than the coefficient along the [111] lattice direction (Alternative Materials Development (LITJ216) Final Report—Stress Birefringence, Intrinsic Birefringence, and Index Properties of 157 nm Refractive Materials, International SEMATECH, Feb. 28, 2002, J. Burnett and R. Morton). Thus, for a given plate thickness, the stress necessary to create a given retardance may be substantially reduced or minimized by orienting the plate with its [100] crystal lattice direction along the optical axis 106. The cubic crystalline stress elements are often used with the [100] orientation (see, e.g., U.S. Pat. No. 6,201,634 issued to S. Sakuma).

A substantially uniform compressive hoop stress can also be applied to the perimeter 192 of a circular window 190 such shown in FIG. 6B to produce a circular uniaxial birefringent plate. Preferably, the result is a substantially uniform magnitude of birefringence over the circular area of the circular window. The applied stress is indicated by arrows 194. For example, a clamp, brace, or other structure around the perimeter of the window 190 can be employed to apply compressive forces.

Oppositely directed force induces opposite birefringence. Compressive and tensile forces applied to cubic crystalline calcium fluoride may be used to induce the appropriate type (i.e., negative or positive) of birefringence.

Figure 7:
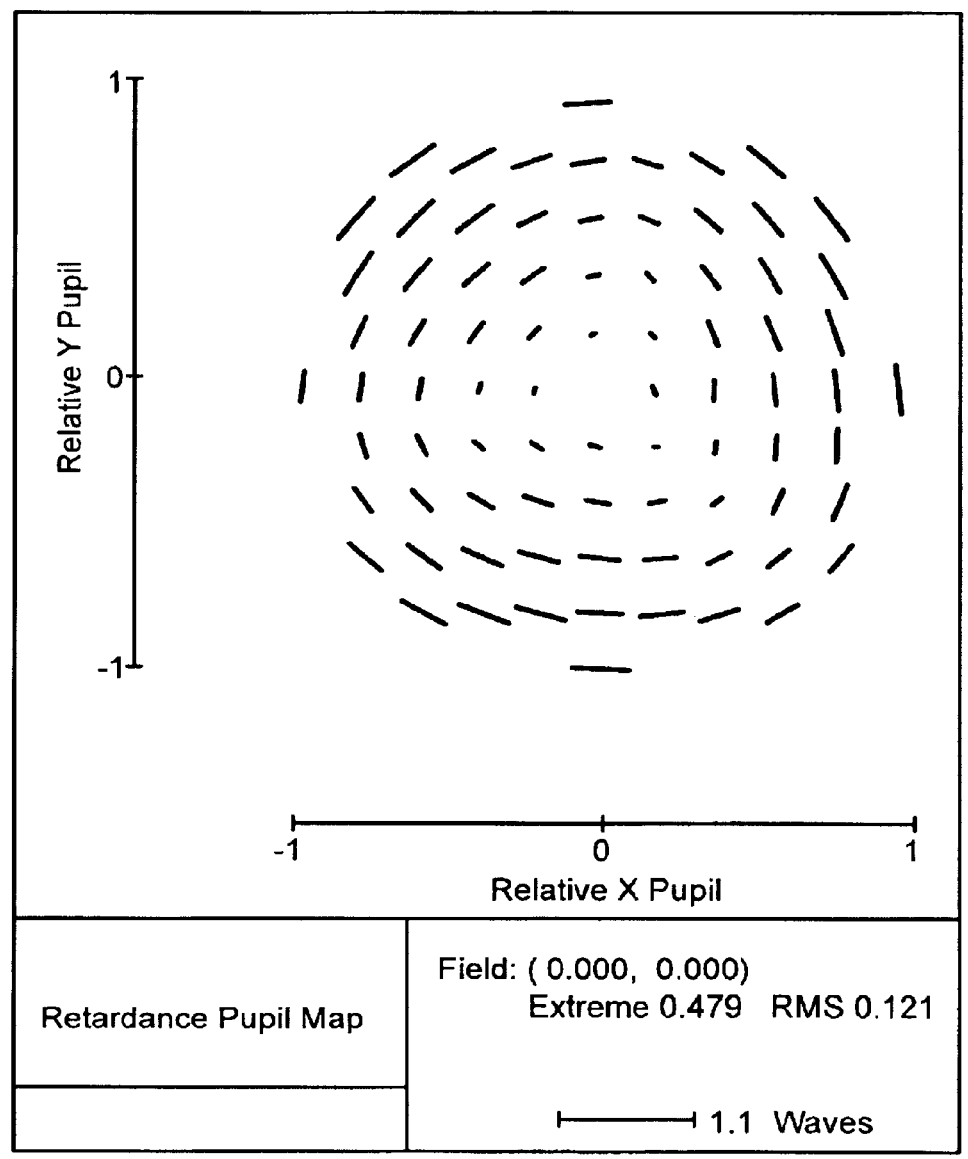
FIG. 7 is a graphical illustration showing the net retardance for an exemplary stressed element such as shown in FIGS. 6A and 6B across the exit pupil for an on-axis field point, wherein the optical element comprises cubic crystalline calcium fluoride having with its [100] crystal axis aligned along optical axis.

FIG. 7 is a graphical illustration showing the net retardance across the exit pupil for light propagating through a stressed flat plate 180, 190 such as discussed above. In this simulation, retardance is computed for a cone of light rays through the stressed plate 180, 190 corresponding to a numerical aperture of 0.85. Also in this example, the plate 180, 190 was assumed to have a thickness of 20 millimeter (mm) and to comprise [100] cubic crystalline calcium fluoride with its [100] crystal axis parallel with the optical axis 106.

In these plots, and the retardance pupil maps to follow, the retardance is shown on a square grid across the system exit pupil for the optical system of interest. As described above, the retardance will generally vary across a wavefront propagating through a birefringent optical system. Accordingly, the retardance will be different for different locations across a cross-section of the beam. The variation plotted in these retardance maps is that across the exit pupil of the optical system 100.

The retardance plots are described in general by ellipses, which sometimes degenerate into lines that show one of the eigenpolarization states. As defined above, the eigenpolarization state is a polarization state that remains unchanged for a ray propagating through the optical system at given pupil coordinates. The eigenpolarization in the plots is the slow eigenpolarization state. The fast and the slow eigenpolarizations are orthogonal. The fast eigenpolarization state corresponds to the eigenpolarization shown in the plot rotated 90° about its center. For example, if the local retardance, be it linear or elliptical, is in the vertical direction, the slow eigenpolarization state will be oriented in the vertical direction and the fast eigenpolarization state will be oriented horizontally. The direction of the ellipse is defined by its major axis; for a vertical ellipse, the major axis is oriented in the vertical direction. We refer to the major axis as the retardance axis. The size of the ellipse or length of the line at a given pupil coordinate is proportional to the relative strength of the retardance, i.e., the phase shift between the fast and slow eigenpolarizations.

Also, for the lenses and corresponding retardance maps, the coordinates are defined using a right-handed coordinate system such that the system optical axis is in the +Z direction from the object towards the image plane, the +Y axis is in the vertical direction, and the +X direction is orthogonal to the Y and Z axes. For the exit pupil retardance and wavefront maps, the plots describe variations over an exit pupil reference sphere for a given field point using a Cartesian coordinate system, where the X and Y coordinates are coordinates on the reference sphere projected onto a plane perpendicular to the chief ray.

The retardance distribution shown in FIG. 7 illustrates the effects of stress induced birefringence on a beam of light. This beam can be conceptualized as a bundle of rays propagating through the stressed optical element. More particularly, the retardance across the exit pupil for a beam of light may be represented by a bundle of rays emanating from an object point on the optical axis 106 through the plate 180, 190 to a location on the image field ideally also located on the optical axis 106. This beam and corresponding bundle of rays fills a real or constructive aperture associated with the plate 180, 190 and also fills the exit pupil. The retardance map in FIG. 7 displays the retardance for rays at each of the locations shown in the exit pupil. These retardance plots thus represent the retardance sampled across this particular beam at the exit pupil.

The peak retardance computed in this example is approximately 0.48 waves at a wavelength of 157.63 nanometers, and the RMS retardance value across the pupil is about 0.12 waves. The retardance was computed for a numerical aperture of about 0.85 and an on-axis field location.

The retardance plot was obtained by simulating the application of about 1000 pounds of stress applied to a [100] calcium fluoride crystal. The magnitude of the uniaxial stress birefringence scales linearly with stress. The stress-optical coefficient $q_{44}$ of $0.46 \times 10^{-12}$ $Pa^{-1}$ at a wavelength of about 157 nanometers has been suggested by Burnett and Morton in Alternative Materials Development (LITJ216) Final Report—Stress Birefringence, Intrinsic Birefringence, and Index Properties of 157 nm Refractive Materials, International SEMATECH, Feb. 28, 2002) yielding a uniaxial stress birefringence of about $-1 \times 10^{-5}$. Higher or lower applied stresses may be possible, however, stresses of less than 1000 pounds are preferred as calcium fluoride ($CaF_2$) may be considered relatively fragile. The cubic crystal plate was also assumed to have a cubic intrinsic birefringence of about $-1.1 \times 10^{-6}$ for purposed of these calculations. The values employed in approximating retardance of the stressed plate 180, 190 are for illustrative purposes. Other values may be used in other simulations as appropriate.

As illustrated, the stress-induced birefringence yields a tangential retardance pattern, i.e., one wherein the orientation of the plotted eigenpolarization state is substantially tangential to concentric circular paths 170 centered around the optical axis 106. The resultant pattern is also largely circularly symmetric, both in magnitude and orientation of the plotted eigenpolarization state. This pattern resembles that produced by a negative uniaxial crystal having a single birefringence or optic axis and negative birefringence, since the stress birefringence is much larger than the intrinsic birefringence ($1 \times 10^{-5}$ versus $-1.1 \times 10^{-6}$). Accordingly, the application of stress is a way of obtaining a birefringent structure that behaves substantially like a material having a single birefringence axis.

Stress can be applied to lenses to provide tangentially directed retardation patterns. The magnitude of the stress will not be uniform across the aperture of the lens, rather, the stress will be larger or smaller at different locations. Thus, the birefringence of the lens will not be uniform and the lens material cannot be modeled as a homogenous uniaxial crystal. However, the variation in birefringence across the lens can provide additional degrees of freedom for the reduction of the retardance aberrations in lenses with intrinsic birefringent elements Another technique for obtaining a uniaxial birefringent structure or medium is through form birefringence. In various preferred embodiments, optical birefringence and more particularly form birefringence is obtained in a stack of alternating thin layers of material having different refractive indices. Specifically, when the layer thickness are much smaller than the wavelength of light propagating therethrough, the resultant birefringence of the aggregate structure is similar to that of a uniaxial crystal having a single crystal axis substantially parallel to the optical axis. See, for example, Yeh and Gu, "Optics of Liquid Crystal Displays", John Wiley & Sons., Inc. 1999, pp. 381–384.

Figure 8:
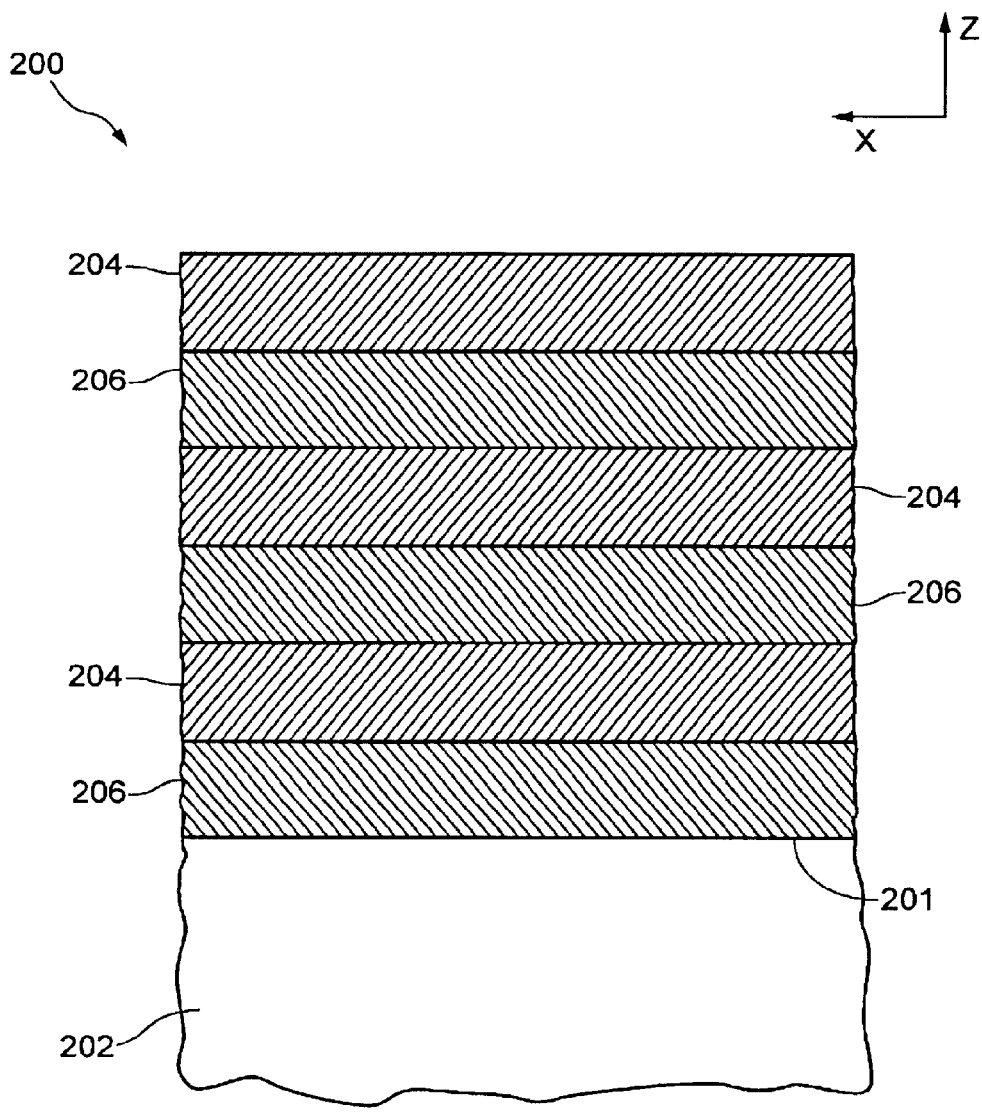
FIG. 8 is a schematic illustration of a form birefringent element comprising a multilayer coating.

An exemplary form birefringent structure comprising a stratified medium 200 formed on a surface 201 of an optical element 202 is shown in FIG. 8. This multilayer structure 200 is preferably substantially optically transmissive to the wavelength of operation, which may be ultraviolet. This multilayer structure 200 comprises alternating layers 204, 206 of materials stacked on each other. The alternating layers 204, 206 preferably have different indices of refraction.

Three pairs of such layers 204, 206 are depicted for illustrative purposes, however, the multilayer structure 200 is not limited to this number. More layers 204, 206 are preferred. The number of pairs of layers 204, 206 may, for example be greater than 50 layers and preferably are between about 100 to 2000. More or less layers are also possible. In addition, although the thickness of the alternating layers 204 and 206 are shown as similar in FIG. 8, the design is not so limited. The layers 204 and 206 may have different thicknesses.

The alternating layers 204 and 206 may, for example, have indices of refraction $n_1$ and $n_2$, respectively. In the case where the thicknesses of these layers are less than the wavelength of light, interference effects can be substantially avoided, and the multilayer structure 200 will exhibit optical anisotropy. Moreover, the stack 200 behaves like a negative birefringent medium wherein $n_e$, the index of refraction for extraordinary rays is less than, $n_o$, the index for ordinary rays (i.e., $n_e < n_o$). Preferably, the thicknesses of these two layers are substantially equal also, to maximize birefringence. The maximum birefringence for the multilayer structure is given by the following equation:

$$\Delta n = n_e - n_o = \frac{-(n_2 - n_1)^2}{\sqrt{2(n_1^2 + n_2^2)}} \quad (1)$$

when the layers have the same thickness.

In certain preferred embodiments for use with 157 nanometer light, one 204 of the alternating layers may comprise lanthanum fluoride $LaF_2$ or gadolinium fluoride $GdF_3$ having an index of refraction of about 1.8 while the other 206 of the alternating layers may comprise aluminum fluoride $AlF_3$ and magnesium fluoride $MgF_2$ having an index of refraction of about 1.47. The resultant birefringence is approximately −0.04. (This value is a maximum birefringence, i.e., the maximum difference between the ordinary and extraordinary refractive indices. The maximum occurs when light rays propagate in the plane of the layers. There is approximately zero birefringence when the rays are normally incident on the plurality of layer.) Other variations and other materials are also suitable.

The multilayer structure 200 may comprise a thin film coating formed on an optical element 202 such as but not limited to a powered refractive element, a plate or window, a reflector or a diffractive optical element. The thin film coating can be on a flat or curved surface. Such curvature may affect the retardance distribution and provides an additional degree of freedom for controlling retardance. The local birefringence axis will be along the surface normal. Additionally, forming the thin film coating on curved surface allows integration of the uniaxial birefringent medium with powered optical elements. Conventional thin film deposition and/or fabrication techniques may be employed to create such a structure 200, however, other methods including those not yet developed are considered possible.

As discussed above, the multilayer structure 200 behaves like a uniaxial crystal having a local birefringent or crystal axis normal to the stack of layers, i.e., in the Z direction illustrated in FIG. 8. The birefringent axis, which is normal to the interfaces between the alternating layers 204, 206 is preferably parallel to the optical axis 106 of the optical element 202 and the optical system 100 in which it is included. In addition, the magnitude of the birefringence is preferably uniform across the resultant form birefringent optical element. For example, for a coating on a circular plate, the magnitude of the birefringence is preferably substantially constant across the circular spatial extent of the plate. The effect of the birefringence will be different at different locations across the plate, if the angle of light incident on the plate is dissimilar at these different locations as shown by the retardance distributions.

Figure 9:
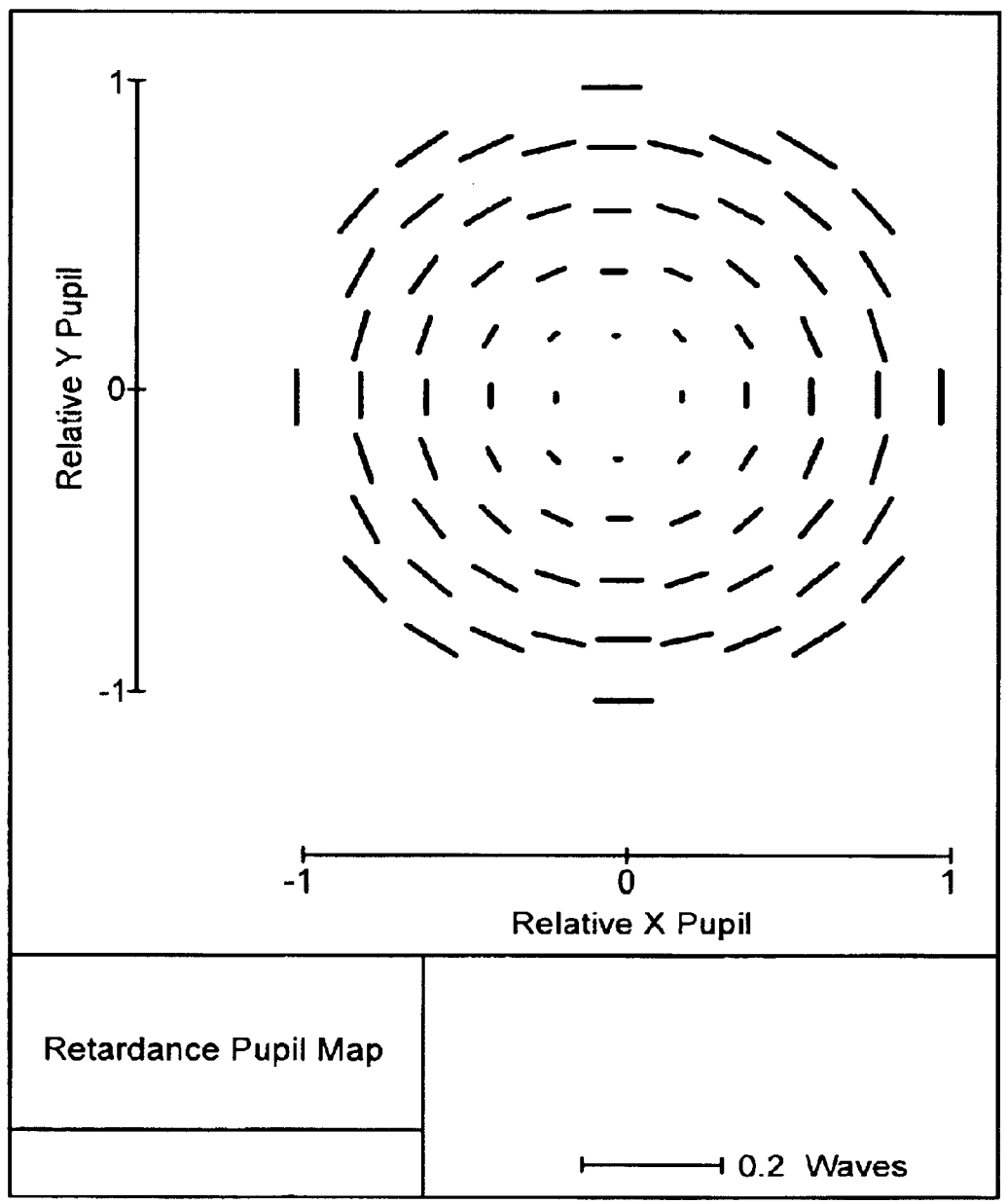
FIG. 9 is a graphical illustration showing the net retardance for an exemplary form birefringent element such as shown in FIG. 8 across the exit pupil for an on-axis field point, wherein the form birefringent element has a single birefringence axis parallel to the optical axis.

FIG. 9 is a graphical illustration showing the net retardance across the exit pupil for light propagating through a form birefringence medium such as the thin film coating structure 200 as shown in FIG. 8. In this example, the thin film coating has a thickness of 1 micron ($\mu$m) and has a form birefringence of about −0.04. Retardance is computed for a cone of light rays through the form birefringence coating corresponding to a numerical aperture of about 0.85. The cone is normally disposed with respect to the coating.

As illustrated, the form birefringence multilayer thin film structure 200 yields a tangential retardance pattern, i.e., one wherein the orientation of the plotted eigenpolarization state is substantially tangential to concentric circular paths 170 centered around the optical axis 106. The resultant pattern is also largely circularly symmetric, both in magnitude and orientation of the plotted eigenpolarization state. This pattern resembles that produced by a negative uniaxial crystal having a single birefringence axis and negative birefringence. Accordingly, the deposition of a form birefringent coating is a way of obtaining a uniaxial birefringent structure that behaves like a uniaxial crystal.

Form birefringence may also be obtained for thin films having microstructures therein, wherein the dimension of the microstructures are smaller than the wavelength of light. Form birefringence in composite media are also discussed in, e.g., Yeh and Gu, "Optics of Liquid Crystal Displays", John Wiley & Sons., Inc. 1999, pp. 381–384. In various other embodiments, such composite media that produces form birefringence may also be employed.

The techniques described above for reducing polarization aberrations caused by intrinsic birefringence are particularly well suited for providing wavefront correction of imaging systems used for photolithography. In addition to the rigorous performance requirements associated with this application, photolithography lenses often include a large number of large refractive and other transmissive optical elements, which together contribute a significant amount of retardance. Wavefront error caused by retardation aberrations can therefore substantially limit the resultant resolution obtained by the photolithographic projection system.

An exemplary projection lens 100, one which contains twenty-one optical elements A1–A21, eighteen of which are substantially optically transmissive to the wavelength of operation, is illustrated in FIG. 1. As discussed above, a similar lens is provided in the tenth embodiment of European Patent Application No. 1 115 019 A2 by D. Shafer et al. This optical system 100 is designed to operate at a central wavelength of 157.63 nanometers. The lens 100 provides approximately 5× reduction at a numerical aperture of about 0.80, and has a rectangular image field with dimensions of about 22 mm to 7 mm. The center of the field is offset from the optical axis 106 by about 4.6 mm. The exemplary design employs seventeen lenses A1, A3–A5, A8–A20, one concave mirror A6 and a planar protecting plate A21. Two other mirrors A2, A7 direct the optical beam along a separate arm of the system 100. Each of the lenses A1, A3–A5, A8–A20 as well as the window A21 are formed of calcium fluoride.

Retardation aberrations are calculated for a similar lens having a similar prescription as disclosed in European Patent Application No. 1 115 019 with each of the lens elements comprising [111] cubic crystalline calcium fluoride having crystal axes substantially identically aligned. Each of these transmissive components A1, A3–A5, A8–A20, and A21 is assumed to have an intrinsic birefringence of about −1.1× $10^{-6}$ in these baseline computations. The actual value of intrinsic birefringence may vary. As discussed above, the exemplary system 100 includes an optical axis 106. The twenty-one (21) optical elements A1–A21 are aligned along this optical axis 106. An optical beam propagates along the optical axis 106, from the object plane 102 to the image plane 104 through the elements A1, A3–A5, A8–A20, and A21 in the lens 100. As indicated above, a plurality of mirrors A2, A6, A7 direct the light along an arm of the system 100 that include several refractive optical elements A3, A4, A5 through which the beam passes twice. Radii and some aspheric coefficients were optimized to improve wavefront errors before intrinsic birefringence was added.

Figure 10B:
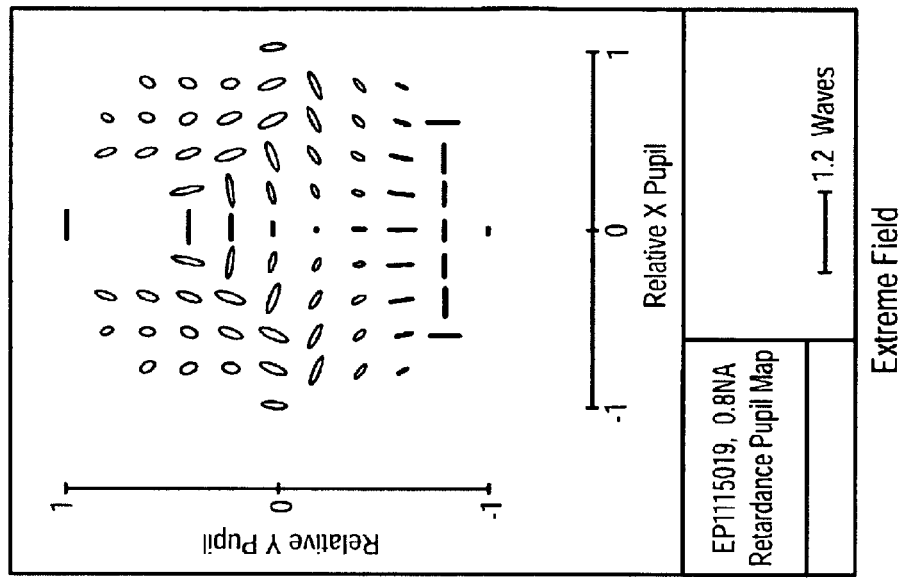
FIGS. 10A and 10B are graphical illustrations showing the net retardance at the exit pupil for an exemplary optical system such as shown in FIG. 1 for on-axis and extreme field points, wherein the optical system comprises [111] cubic crystal calcium fluoride optical elements having respective crystal axes substantially identically aligned.
Figure 10A:
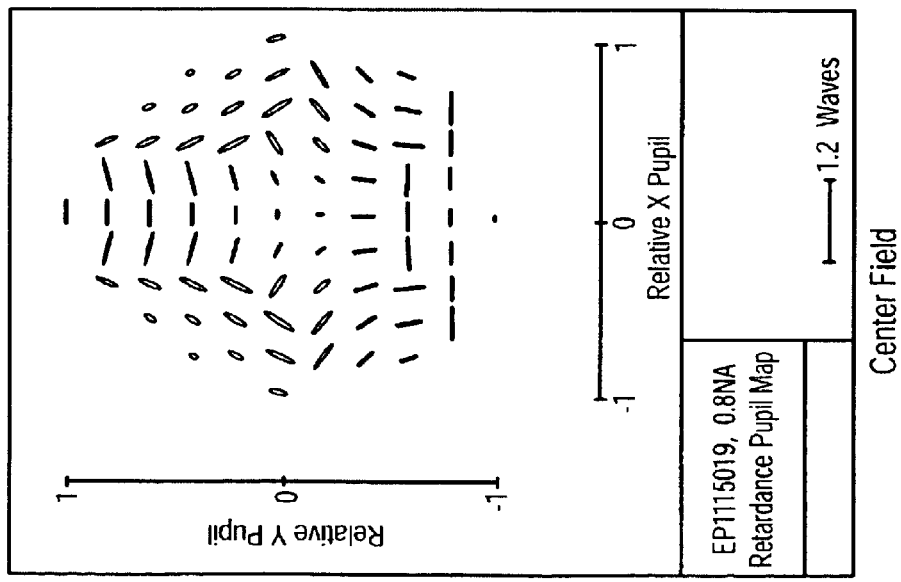

When the effects of intrinsic birefringence associated with the cubic crystalline lens material are taken into account, system performance degrades significantly. FIGS. 10A and 10B are graphical illustrations showing the net retardance across the system exit pupil for field points at the center and edge of the field, respectively, according to an exemplary embodiment in which all transmissive elements A1, A3–A5, A8–A20, and A21, shown in FIG. 1, are identically aligned in three dimensions, with the elements having their [111] crystal axis direction along the optical axis 106. FIGS. 10A and 10B include the effects of intrinsic birefringence. FIG. 10A shows the net retardance at various positions across the exit pupil for a beam of light originating from a point in the object field location which is 0 mm away from the optical axis 106. FIG. 10B quantifies the net retardance at various locations across the exit pupil for a beam of light originating from an off-axis point in the object field. These two points correspond to center and edge field points, respectively. This edge field point may, for example, map into a point at the edge of the frame of a photolithography instrument for processing semiconductor wafers. The peak-to-valley retardance due to intrinsic birefringence in this exemplary arrangement is approximately 1 wave on-axis and at the extreme field.

In this preceding example, as illustrated in FIGS. 10A–10B, the intrinsic birefringence produces large retardance aberrations and consequently large wavefront aberrations when each of the substantially optically transmissive elements A1, A3–A5, A8–A20, and A21 comprise [111] cubic crystal calcium fluoride having the respective crystal axes oriented identically. Without compensation, this wavefront aberration strongly exceeds the allowable wavefront error for high precision photolithography.

The retardance, however, can be reduced by clocking the [111] cubic crystal elements in a first portion of the optical system 100 and introducing a uniaxial birefringent element in a second portion of the optical system. Preferably, this uniaxial birefringent element comprises a medium having a single birefringence axis and a negative birefringence. Moreover, the retardance in the two portions preferably cancel, yielding a net reduction in retardance aberration.

Figure 11:
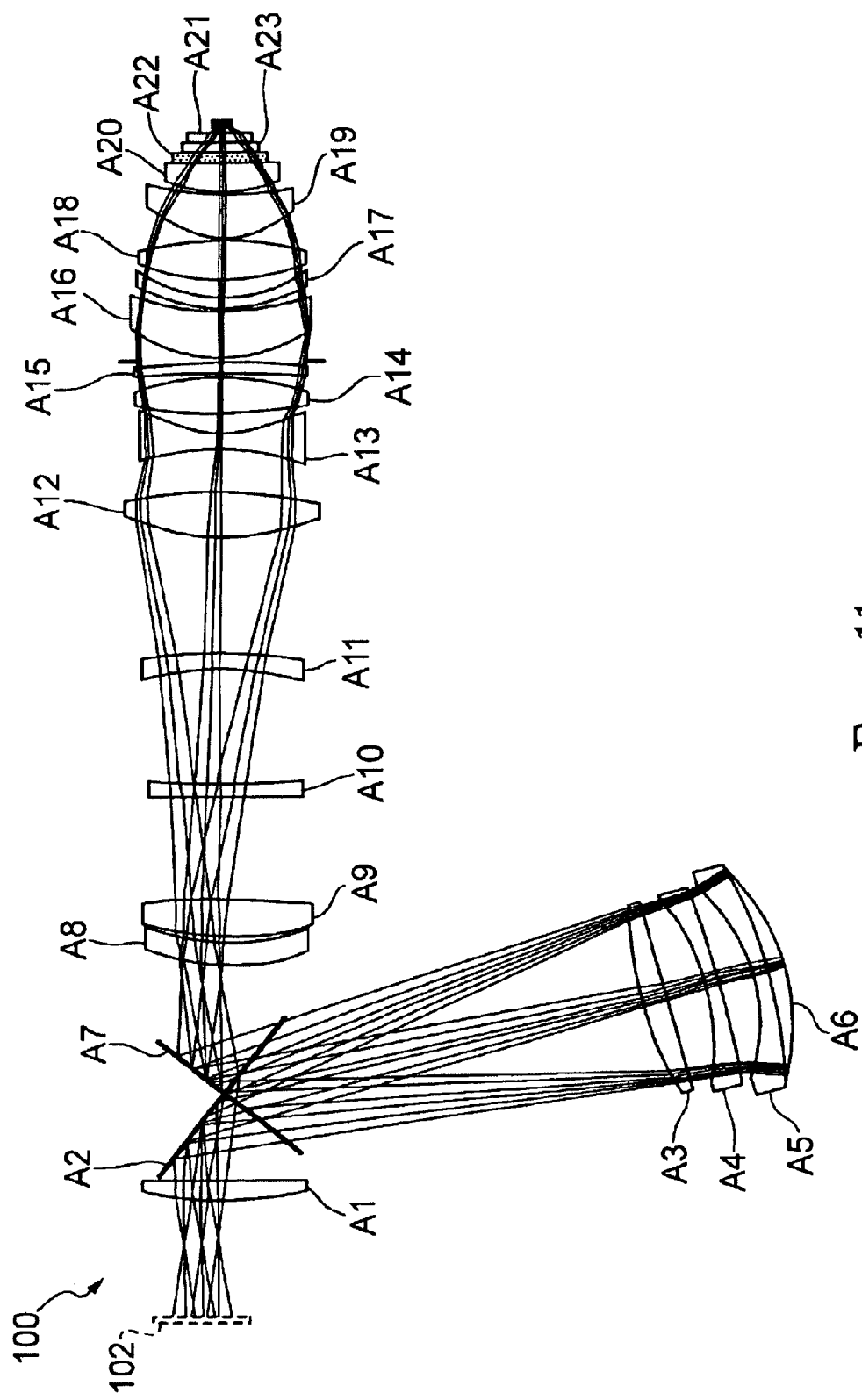
FIG. 11 is a cross-sectional view of a projection optics similar to that shown in FIG. 1 further comprising a stress plate with uniaxial birefrincence.

FIG. 11 illustrates a similar photolithography system as that presented in FIG. 1 comprising a plurality of [111] cubic crystal optical element A1, A3–A5, A8–A21. Additionally, however, a stressed plate A22 having uniaxial birefringence has been included. This stressed plate A22 preferably comprises a rectangular plate stressed along two orthogonal axes such as depicted in FIG. 6A. These results also apply to a circular plate as well where the stress is uniform throughout the portion of plate through which the beam passes. Furthermore, the plurality of [111] cubic crystalline optical elements A1, A3–A5, A8–A21 in the lens 100 have been appropriately clocked to produce a substantially circularly symmetric retardance distribution having radially directed local retardance axes. This radial distribution is at least partially canceled by the substantially circularly symmetric tangential distribution produced by the stressed plate A22.

The dimensions of the exemplary system 100, which is based on the system in EP 1 115 019 A2, are listed in TABLE I. Radii were selected to improve wavefront errors before instrinsic birefringence was added. Several of the surfaces are aspheric surfaces and have an aspheric correction listed in TABLE II below.

TABLE I

| Elements | Surface | Radius | Thickness | Glass |
|---|---|---|---|---|
| | 1 | 0.000 | 4.000 | |
| A1 | 2 | 312.337 | 18.000 | CaF$_2$ |
| | 3 | 9682.901 | 83.000 | |
| A2 | 4 | 0.000 | 0.000 | REFL |
| | 5 | 0.000 | −414.787 | |
| A3 | 6 | −405.553 | −22.000 | CaF$_2$ |
| | 7 | −2462.671 | −41.117 | |
| A4 | 8 | 203.797 | −13.000 | CaF$_2$ |
| | 9 | 1424.672 | −33.321 | |
| A5 | 10 | 176.135 | −14.000 | CaF$_2$ |
| | 11 | 480.495 | −16.562 | |
| A6 | 12 | 241.213 | 16.562 | REFL |
| A5 | 13 | 480.495 | 14.000 | CaF$_2$ |
| | 14 | 176.135 | 33.321 | |
| A4 | 15 | 1424.672 | 13.000 | CaF$_2$ |
| | 16 | 203.797 | 41.117 | |
| A3 | 17 | −2462.671 | 22.000 | CaF$_2$ |
| | 18 | −405.553 | 409.787 | |
| | 19 | 0.000 | 0.000 | |
| A7 | 20 | 0.000 | −70.541 | REFL |
| | 21 | 0.000 | −59.941 | |
| A8 | 22 (aspheric) | −190.019 | −20.601 | CaF$_2$ |
| | 23 | −179.904 | −6.323 | |
| A9 | 24 (aspheric) | −210.098 | −39.347 | CaF$_2$ |
| | 25 | 473.115 | −103.837 | |
| A10 | 26 (aspheric) | 3696.826 | −15.000 | CaF$_2$ |
| | 27 | −1457.621 | −116.884 | |
| A11 | 28 | 245.073 | −15.000 | CaF$_2$ |
| | 29 (aspheric) | 470.016 | −119.416 | |
| A12 | 30 | −211.145 | −46.407 | CaF$_2$ |
| | 31 | 390.083 | −41.600 | |
| A13 | 32 | 214.849 | −15.000 | CaF$_2$ |
| | 33 (aspheric) | −152.910 | −22.009 | |
| A14 | 34 | −456.248 | −36.555 | CaF$_2$ |
| | 35 | 231.784 | −1.000 | |
| A15 | 36 | 3335.791 | −13.249 | CaF$_2$ |
| | 37 | 798.419 | −1.000 | |
| Aperture | 38 | 0.000 | −4.033 | |
| A16 | 39 | −158.376 | −46.695 | CaF$_2$ |
| | 40 | −286.107 | −1.000 | |
| A17 | 41 | −172.677 | −12.000 | CaF$_2$ |
| | 42 (aspheric) | −126.530 | −15.768 | |
| A18 | 43 | −216.243 | −41.405 | CaF$_2$ |
| | 44 | 241.000 | −1.000 | |
| A19 | 45 | −92.147 | −44.386 | CaF$_2$ |
| | 46 (aspheric) | −251.015 | −2.210 | |
| A20 | 47 | −162.887 | −24.949 | CaF$_2$ |
| | 48 | 0.000 | 0.000 | |
| A22 | 49 STRESSED | 0.000 | −10.701 | CaF$_2$ |
| | 50 | 0.000 | 0.000 | |
| A23 | 51 | 0.000 | −11.000 | CaF$_2$ |
| | 52 (aspheric) | 556.157 | 0.000 | |
| A21 | 53 | 0.000 | −6.000 | CaF$_2$ |
| | 54 | 0.000 | −12.000 | |
| | 55 | 0.000 | 0.000 | |

TABLE II

| Element | Surface | Aspheric | Coefficients |
|---|---|---|---|
| A8 | 22 | K | 0.00000 |
| | | A | 0.152508E × 10$^{-7}$ |
| | | B | −0.116620 × 10$^{-12}$ |
| | | C | 0.783384 × 10$^{-16}$ |
| | | D | 0.159899 × 10$^{-19}$ |
| | | E | −0.722908 × 10$^{-23}$ |
| | | F | 0.728881 × 10$^{-27}$ |
| A9 | 24 | K | 0.000000 |
| | | A | −0.923147 × 10$^{-9}$ |
| | | B | 0.225315 × 10$^{-12}$ |
| | | C | −0.126393 × 10$^{-15}$ |
| | | D | 0.158659 × 10$^{-19}$ |
| | | E | −0.351522 × 10$^{-24}$ |
| | | F | −0.111972 × 10$^{-27}$ |
| A10 | 26 | K | 0.000000 |
| | | A | 0.255822 × 10$^{-7}$ |
| | | B | −0.355557 × 10$^{-12}$ |
| | | C | −0.221879 × 10$^{-16}$ |
| | | D | 0.325041 × 10$^{-20}$ |
| | | E | −0.820304 × 10$^{-24}$ |
| | | F | 0.797702 × 10$^{-28}$ |
| A11 | 29 | K | 0.000000 |
| | | A | 0.253064 × 10$^{-8}$ |
| | | B | −0.133794 × 10$^{-11}$ |
| | | C | −0.110469 × 10$^{-16}$ |
| | | D | −0.376252 × 10$^{-21}$ |
| | | E | −0.129137 × 10$^{-25}$ |
| | | F | 0.108061 × 10$^{-29}$ |
| A13 | 33 | K | 0.000000 |
| | | A | −0.672468 × 10$^{-7}$ |
| | | B | 0.225146 × 10$^{-11}$ |
| | | C | 0.688454 × 10$^{-16}$ |
| | | D | −0.398582 × 10$^{-21}$ |
| | | E | 0.875403 × 10$^{-25}$ |
| | | F | −0.559169 × 10$^{-29}$ |
| A17 | 42 | K | 0.000000 |
| | | A | −0.173609 × 10$^{-7}$ |
| | | B | −0.219959 × 10$^{-11}$ |
| | | C | −0.714521 × 10$^{-16}$ |
| | | D | −0.762080 × 10$^{-20}$ |
| | | E | 0.114026 × 10$^{-23}$ |
| | | F | −0.121463 × 10$^{-27}$ |
| A19 | 46 | K | 0.000000 |
| | | A | 0.912071 × 10$^{-7}$ |
| | | B | −0.297373 × 10$^{-11}$ |
| | | C | −0.119624 × 10$^{-14}$ |
| | | D | 0.137621 × 10$^{-18}$ |
| | | E | 0.230309 × 10$^{-22}$ |
| | | F | −0.952224 × 10$^{-27}$ |
| A23 | 52 | K | 0.000000 |
| | | A | −0.685740 × 10$^{-7}$ |
| | | B | −0.194597 × 10$^{-10}$ |
| | | C | 0.424640 × 10$^{-14}$ |
| | | D | −0.112292 × 10$^{-16}$ |
| | | E | 0.533395 × 10$^{-20}$ |
| | | F | −0.149893 × 10$^{-23}$ |

As is well known, aspheric surfaces may be defined by the following expression:

$$A\rho^4 + B\rho^5 + C\rho^6 + D\rho^7 + E\rho^8 + F\rho^9 \quad (2)$$

where $\rho$ is the radial dimension. In Table II, K is the conic constant.

To introduce correction for retardance aberration, the last lens element A20 has been split into a plane parallel plate A22, which is stressed, and two lenses A20 and A23. The window A21 is adjacent the added lens A23. The plane parallel plate A21 may comprise [111] cubic crystal calcium fluoride with the [111] axis substantially parallel to the optical axis 106, and the two lenses A20 and A23 preferably comprise [111] cubic crystal calcium fluoride with the [111] crystal axis substantially parallel to the optical axis 106. The stress applied to the plane parallel plate A22 produces a uniaxial birefringence of about −2×10$^{-6}$ along, i.e., parallel to, the optical axis 106. Such a component A22, therefore behaves as a negative uniaxial crystal having a single crystal axis aligned with the optical axis.

In addition, the substantially [111] cubic crystalline optical elements A1, A3–A5, A8–A21, and A23, are clocked as described above, to provide a circularly symmetric radial retardance distribution. The direction and amount of axial rotation is selected to yield retardance substantially equal to but opposite the retardance introduced by the uniaxial birefringent optical element, i.e. the stressed plate A22, which has a retardance like that of a uniaxial crystal with negative birefringence. These elements A1, A3–A5, A8–A21, and A23 are considered the first portion of the optical system 100. Exemplary clocking values for this system 100 are shown in TABLE III. For [111] optical elements oriented with their [111] crystal axis along optical axis 106, preferably the clocking of each element is given relative to an orientation that produces peak retardance lobes 60, 180, and 300 degrees in the pupil. It should be understood that such is exemplary only and the relative clocking of the elements may be described with respect to any of various arbitrary reference locations. Positive rotations are right handed about the local +Z axis at the lens element.

TABLE III

| Elements | Surface | Clocking (degrees) |
|---|---|---|
| A1 | 1 | 0 |
|  | 2 | 36 |
|  | 3 | 0 |
| A2 | 4 | 0 (reflector) |
|  | 5 | 0 |
| A3 | 6 | 7 |
|  | 7 | 0 |
| A4 | 8 | 181 |
|  | 9 | 0 |
| A5 | 10 | 246 |
|  | 11 | 0 |
| A6 | 12 | 0 (reflector) |
| A5 | 13 | 246 |
|  | 14 | 0 |
| A4 | 15 | 181 |
|  | 16 | 0 |
| A3 | 17 | 7 |
|  | 18 | 0 |
|  | 19 | 0 |
| A7 | 20 | 0 (reflector) |
|  | 21 | 0 |
| A8 | 22 (aspheric) | 268 |
|  | 23 | 0 |
| A9 | 24 (aspheric) | 239 |
|  | 25 | 0 |
| A10 | 26 (aspheric) | 359 |
|  | 27 | 0 |
| A11 | 28 | 22 |
|  | 29 (aspheric) | 0 |
| A12 | 30 | 20 |
|  | 31 | 0 |
| A13 | 32 | 193 |
|  | 33 (aspheric) | 0 |
| A14 | 34 | 66 |
|  | 35 | 0 |
| A15 | 36 | 245 |
|  | 37 | 0 |
| A.S. | 38 | 0 |
| A16 | 39 | 303 |
|  | 40 | 0 |
| A17 | 41 | 332 |
|  | 42 (aspheric) | 0 |
| A18 | 43 | 333 |
|  | 44 | 0 |
| A19 | 45 | 32 |
|  | 46 (aspheric) | 0 |
| A20 | 47 | 341 |
|  | 48 | 0 |

TABLE III-continued

| Elements | Surface | Clocking (degrees) |
|---|---|---|
| A22 | 49 STRESSED | 43 |
|  | 50 | 0 |
| A23 | 51 | 333 |
|  | 52 (aspheric) | 0 |
| A21 | 53 | 168 |
|  | 54 | 0 |
|  | 55 | 0 |

Figure 12:
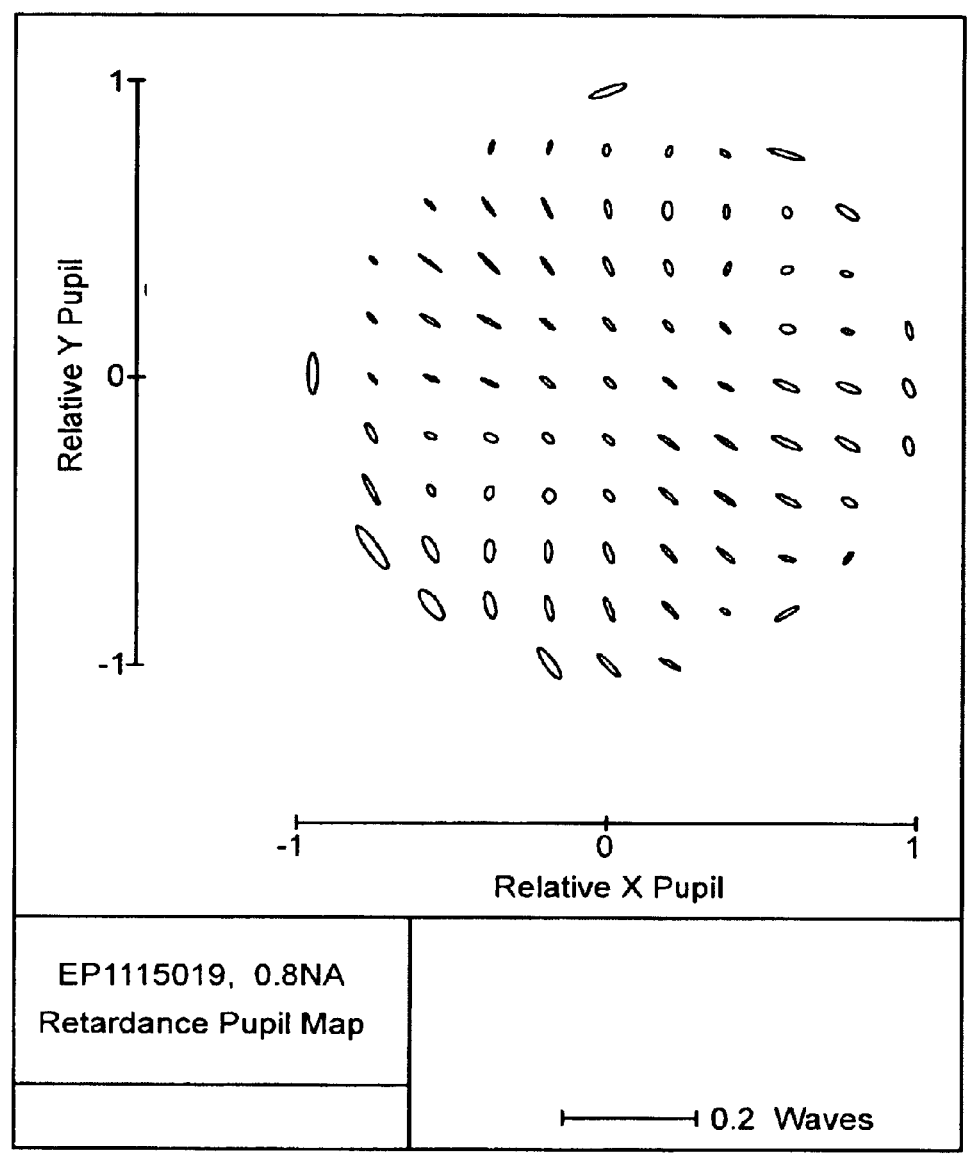
FIG. 12 is a graphical illustration showing the net retardance for an exemplary optical system such as shown in FIG. 11 across the exit pupil for an off-axis field point.

The stressed plate A22 corresponds to the second portion of the optical system 100, the two portions preferably substantially offsetting each other so as to reduce net retardance aberrations. FIG. 12 is a graphical representation that depicts the net retardance across the system exit pupil at an extreme edge field point due to intrinsic birefringence of all elements A1–A23, including the stressed plate. The extreme edge point in this example is about 55 mm on the x-axis and 40 mm on the y-axis (x=−55 mm; y=40 mm). As shown, the net retardance has been significantly reduced compared with the retardance for all [111] elements without the stressed plate A22, which is shown in FIG. 1, and without the appropriate clocking.

The RMS and maximum retardance over the exit pupil are listed in TABLE IV below for nine field positions. The results for field nine are graphically illustrated in FIG. 12. The intrinsic birefringence of about $-1.1 \times 10^{-6}$ was assumed for the [111] cubic crystal optical elements. The RMS retardance ranging from 0.0094 to 0.0146 waves at $\lambda_o=157$ nm is shown. A greater than about 10× reduction in retardance aberration is achieved in this example. The numerical aperture of this system 100 is about 0.8. In this embodiment, the variation in net retardance after compensation with the negative uniaxial structure is minimal. However, if there were significant variation across the field, then one or more additional uniaxial structures could be placed elsewhere in the lens to reduce or minimize the variation of retardance aberrations over the field.

TABLE IV

| Field Number | X (mm) | Y (mm) | Retardance (waves) Maximum | RMS |
|---|---|---|---|---|
| 1 | 0 | 23 | 0.0555 | 0.0097 |
| 2 | 39 | 6 | 0.0466 | 0.0094 |
| 3 | 55 | 6 | 0.0721 | 0.0126 |
| 4 | 39 | 40 | 0.0651 | 0.0133 |
| 5 | 55 | 40 | 0.0844 | 0.0142 |
| 6 | −39 | 6 | 0.0564 | 0.0104 |
| 7 | −55 | 6 | 0.0760 | 0.0136 |
| 8 | −39 | 40 | 0.0631 | 0.0120 |
| 9 | −55 | 40 | 0.0847 | 0.0146 |

As illustrated, the net retardance has been significantly reduced compared with the retardance for the all [111] element system 100 without clocking and without the stressed plate A22, which are shown in FIGS. 10A and 10B. Thus, substantial retardance correction for a system 100 comprising all [111] optical elements is possible by appropriately clocking the [111] elements and using one or more uniaxial birefringent elements A22 that have a retardance distribution conjugate to the retardance of the clocked [111]elements. In particular, the system retardance associated with this catadioptric optical system 100 is significantly reduced to levels acceptable for high numerical aperture lithography.

The retardance can also be reduced by clocking the cubic crystal elements in a first portion of the optical system 100 and introducing one or more form birefringent optical element having a single birefringence axis into a second portion of the optical system. The retardance in the two portions preferably cancels, yielding a net reduction in retardance aberration.

Figure 13:
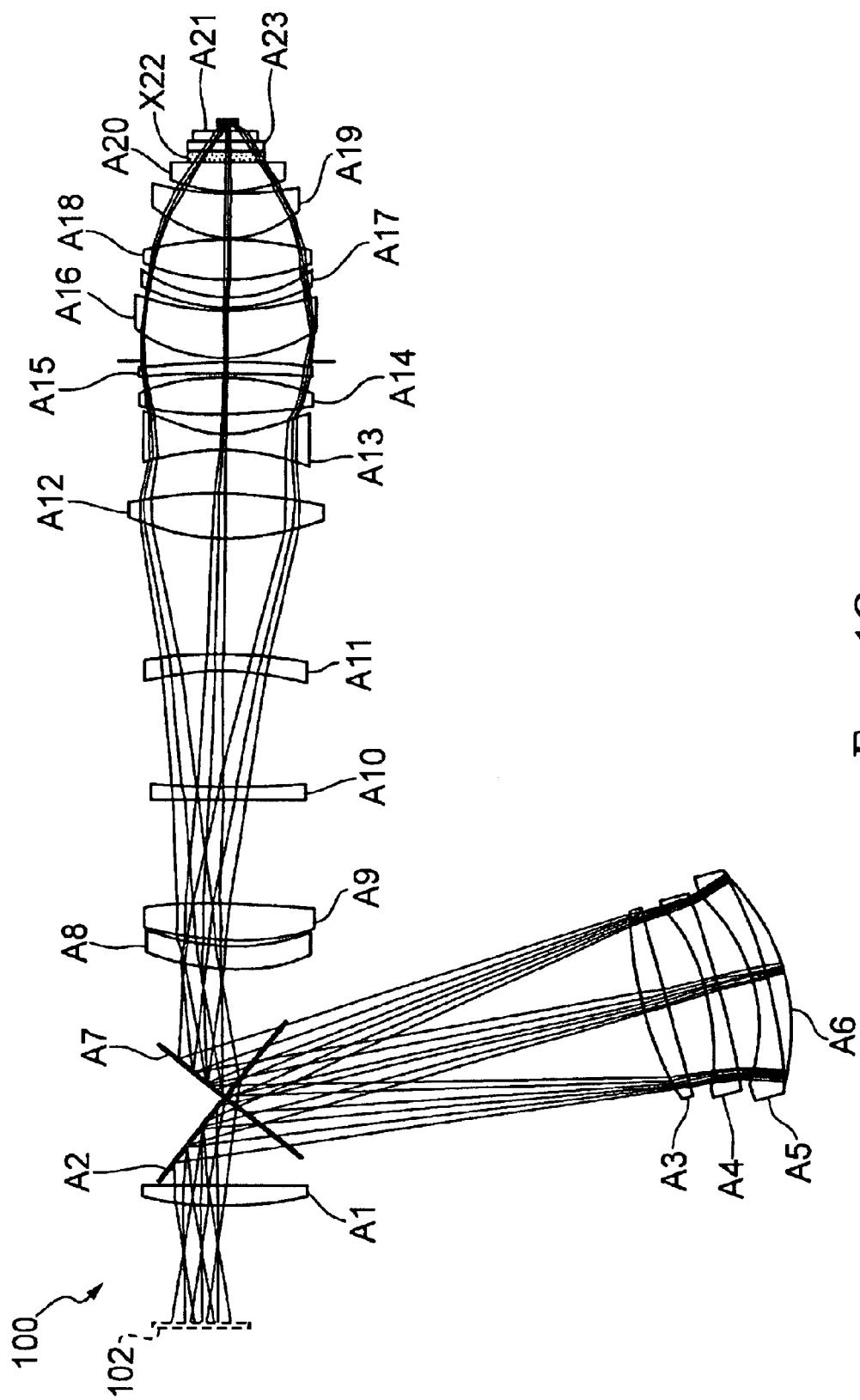
FIG. 13 is a cross-sectional view of a projection optics similar to that shown in FIG. 1 further comprising a form birefringent element.

FIG. 13 illustrates a similar photolithography system 100 as that presented in FIG. 1 with the addition of a thin film layer X22 having a uniaxial birefringence formed on the surface (51) of one of the optical elements A23. In one example, this thin film layer X22 is about 5 microns thick although the dimensions of the thin film layer X22 should not be so limited. (The size of this thin film layer X22 is exaggerated for clarity in this drawing.) The thin film X22 preferably comprises alternating layers of material having different indices of refraction such as depicted in FIG. 8. More specifically, this multilayer film X22 is preferably substantially optically transmissive at the wavelength of operation and provides form birefringence as discussed above. In addition, the plurality of [111] cubic crystalline calcium fluoride optical elements A1, A3–A5, A8–A21, and A23 have been appropriately clocked to produce a substantially circularly symmetric retardance distribution having radially directed retardance axes. This radial distribution is at least partially canceled by the substantially circularly symmetric tangential distribution of the form birefringent multilayer.

The dimensions of the exemplary system 100, which is based on the system in EP 1 115 019 A2, are listed in TABLE V. Several of the surfaces are aspheric surfaces, and have the aspheric correction listed in TABLE II above. The optically transmissive lens elements A1, A3–A5, and A8–A20 as well as the window A21 were assumed to be formed from [111] cubic crystal calcium fluoride with respective [111] crystal axes parallel to the optical axis 106.

TABLE V

| Elements | Surface | Radius | Thickness | Glass |
|---|---|---|---|---|
|  | 1 | 0.000 | 4.000 |  |
| A1 | 2 | 312.337 | 18.000 | CaF$_2$ |
|  | 3 | 9682.901 | 83.000 |  |
| A2 | 4 | 0.000 | 0.000 | REFL |
|  | 5 | 0.000 | −414.787 |  |
| A3 | 6 | −405.553 | −22.000 | CaF$_2$ |
|  | 7 | −2462.671 | −41.117 |  |
| A4 | 8 | 203.797 | −13.000 | CaF$_2$ |
|  | 9 | 1424.672 | −33.321 |  |
| A5 | 10 | 176.135 | −14.000 | CaF$_2$ |
|  | 11 | 480.495 | −16.562 |  |
| A6 | 12 | 241.213 | 16.562 | REFL |
| A5 | 13 | 480.495 | 14.000 | CaF$_2$ |
|  | 14 | 176.135 | 33.321 |  |
| A4 | 15 | 1424.672 | 13.000 | CaF$_2$ |
|  | 16 | 203.797 | 41.117 |  |
| A3 | 17 | −2462.671 | 22.000 | CaF$_2$ |
|  | 18 | −405.553 | 409.787 |  |
|  | 19 | 0.000 | 0.000 |  |
| A7 | 20 | 0.000 | −70.541 | REFL |
|  | 21 | 0.000 | −59.941 |  |
| A8 | 22 (aspheric) | −190.019 | −20.601 | CaF$_2$ |
|  | 23 | −179.904 | −6.323 |  |
| A9 | 24 (aspheric) | −210.098 | −39.347 | CaF$_2$ |
|  | 25 | 473.115 | −103.837 |  |
| A10 | 26 (aspheric) | 3696.826 | −15.000 | CaF$_2$ |
|  | 27 | −1457.621 | −116.884 |  |
| A11 | 28 | 245.073 | −15.478 |  |
|  | 29 (aspheric) | 470.016 | −119.416 |  |
| A12 | 30 | −211.145 | −46.407 | CaF$_2$ |
|  | 31 | 390.083 | −41.600 |  |
| A13 | 32 | 214.849 | −15.000 | CaF$_2$ |
|  | 33 (aspheric) | −152.910 | −22.009 |  |

TABLE V-continued

| Elements | Surface | Radius | Thickness | Glass |
|---|---|---|---|---|
| A14 | 34 | −456.248 | −36.555 | CaF$_2$ |
|  | 35 | 231.784 | −1.000 |  |
| A15 | 36 | 3335.791 | −13.249 | CaF$_2$ |
|  | 37 | 798.419 | −1.000 |  |
| Aperture | 38 | 0.000 | −4.033 |  |
| A16 | 39 | −158.376 | −46.695 | CaF$_2$ |
|  | 40 | −286.107 | −1.000 |  |
| A17 | 41 | −172.677 | −12.000 | CaF$_2$ |
|  | 42 (aspheric) | −126.530 | −15.768 |  |
| A18 | 43 | −216.243 | −41.405 | CaF$_2$ |
|  | 44 | 241.000 | −1.000 |  |
| A19 | 45 | −92.147 | −44.386 | CaF$_2$ |
|  | 46 (aspheric) | −251.015 | −2.210 |  |
| A20 | 47 | −162.887 | −35.645 | CaF$_2$ |
|  | 48 | 0.000 | 0.000 |  |
| X22 | 49 FILM | 0.000 | −0.005 | CaF$_2$ |
|  | 50 | 0.000 | 0.000 |  |
| A23 | 51 | 0.000 | −11.000 | CaF$_2$ |
|  | 52 (aspheric) | 556.157 | 0.000 |  |
| A21 | 53 | 0.000 | −6.000 | CaF$_2$ |
|  | 54 | 0.000 | −12.000 |  |
|  | 55 | 0.000 | 0.000 |  |

To introduce correction for retardance aberration, the last lens element A20 is split into two lens A20 and A23. A form birefringent coating X22 has been included between the two lenses A20, A23. This form birefringent coating X22 may, for example, be formed on the surface (51) of the added lens A23. The window A21 is adjacent the additional lens A23. Both lenses A20 and A23 were assumed to be [111] cubic crystal calcium fluoride. Calculations are based on a form birefringent coating 200 that comprises alternating layers of relatively high ($n_1$) and low ($n_2$) indices of refraction of 1.8 and 1.47, respectively. As discussed above, for example, the high index layers may comprise LaF$_3$ or GdF$_3$, and the low index layers may comprise AlF$_3$ or MgF$_2$. Other materials may be used as well. The form birefringent coating X22 was assumed to be 5.0 micrometers thick and to yield a uniaxial birefringence of about 0.04. Such a structure X22 behaves as a negative uniaxial crystal having a birefringent or crystal axis normal to the planar surface (51) and parallel to the optical axis 106.

In addition, the substantially [111] cubic crystalline optical elements A1, A3–A5, A8–A21, and A23 are clocked, as described above, to provide a circularly symmetric radially directed retardance distribution. The direction and amount of axial rotation is selected to produce a retardance pattern substantially equal to but opposite the retardance distribution introduced by the uniaxial birefringent optical element, i.e. the form birefringent coating X22. As discussed above, the form birefringent coating X22 has a birefringence similar to that of a uniaxial crystal with negative birefringence. These [111] cubic crystal optical elements A1, A3–A5, A8–A21, and A23 are considered the first portion of the optical system 100 which is balanced or matched by the retardance introduced by the form birefringent coating X22. Exemplary clocking values for this system 100 are shown in TABLE VI. Positive rotations are right handed about the local +Z axis at the lens element.

TABLE VI

| Elements | Surface | Clocking (degrees) |
|---|---|---|
|  | 1 | 0 |
| A1 | 2 | 334 |
|  | 3 | 0 |

TABLE VI-continued

| Elements | Surface | Clocking (degrees) |
|---|---|---|
| A2 | 4 | 0 (reflector) |
|  | 5 | 0 |
| A3 | 6 | 79 |
|  | 7 | 0 |
| A4 | 8 | 135 |
|  | 9 | 0 |
| A5 | 10 | 197 |
|  | 11 | 0 |
| A6 | 12 | 0 (reflector) |
| A5 | 13 | 197 |
|  | 14 | 0 |
| A4 | 15 | 135 |
|  | 16 | 0 |
| A3 | 17 | 79 |
|  | 18 | 0 |
|  | 19 | 0 |
| A7 | 20 | 0 (reflector) |
|  | 21 | 0 |
| A8 | 22 (aspheric) | 72 |
|  | 23 | 0 |
| A9 | 24 (aspheric) | 178 |
|  | 25 | 0 |
| A10 | 26 (aspheric) | 181 |
|  | 27 | 0 |
| A11 | 28 | 181 |
|  | 29 (aspheric) | 0 |
| A12 | 30 | 173 |
|  | 31 | 0 |
| A13 | 32 | 2 |
|  | 33 (aspheric) | 0 |
| A14 | 34 | 123 |
|  | 35 | 0 |
| A15 | 36 | 203 |
|  | 37 | 0 |
| Aperture | 38 | 0 |
| A16 | 39 | 37 |
|  | 40 | 0 |
| A17 | 41 | 234 |
|  | 42 (aspheric) | 0 |
| A18 | 43 | 340 |
|  | 44 | 0 |
| A19 | 45 | 360 |
|  | 46 (aspheric) | 0 |
| A20 | 47 | 58 |
|  | 48 | 0 |
| X22 | 49 FILM | 0 |
|  | 50 | 0 |
| A23 | 51 | 272 |
|  | 52 (aspheric) | 0 |
| A21 | 53 | 77 |
|  | 54 | 0 |
|  | 55 | 0 |

Figure 14:
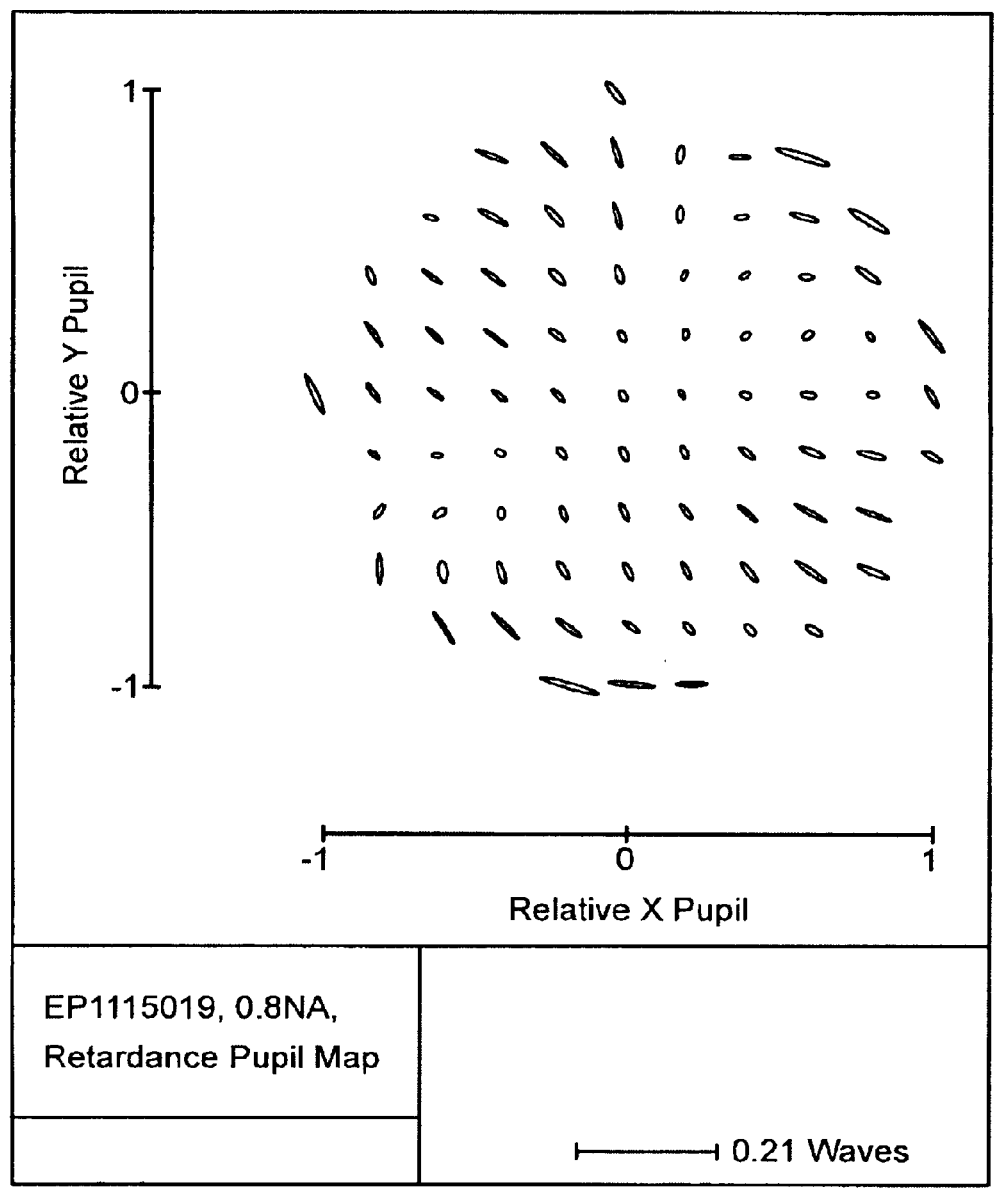
FIG. 14 is a graphical illustration showing the net retardance for an exemplary optical system such as shown in FIG. 13 across the exit pupil for an off-axis field point.

The form birefringent coating X22 corresponds to the second portion of the optical system, the two portions preferably substantially offsetting each other so as to substatially reduce net retardance aberrations. FIG. 14 is a graphical representation that depicts the net retardance across the system exit pupil at an extreme edge field point due to instrict birefringence of all elements A1–A23, including the form birefringent coating X22. As shown, the net retardance has been significantly reduced compared with the retardance for the comparable system 100 comprising all [111] elements without the form birefringent coating X22 which is shown in FIG. 1. The resultant retardance for off-axis points for this uncorrected system 100 is present in FIG. 10B as discussed above.

The RMS and maximum retardance over the exit pupil are listed in TABLE VII below for nine field positions. The results from the ninth field point are graphically illustrated in FIG. 14. The RMS retardance ranging from 0.0118 to 0.0173 waves at $\lambda_o$=157 nm is shown. This residual retardance is largely a fourth order variation. Accordingly, greater than about 10× reduction in retardance aberration is achieved in this example. The numerical aperture of this system 100 is about 0.8. Intrinsic birefringence of about $-1.1 \times 10^{-6}$ has been assumed for the [111] cubic crystal optical elements.

TABLE VII

| Field Number | X (mm) | Y (mm) | Retardance (waves) Maximum | RMS |
|---|---|---|---|---|
| 1 | 0 | 23 | 0.0607 | 0.0118 |
| 2 | 39 | 6 | 0.0704 | 0.0127 |
| 3 | 55 | 6 | 0.0813 | 0.0146 |
| 4 | 39 | 40 | 0.0769 | 0.0142 |
| 5 | 55 | 40 | 0.0909 | 0.0167 |
| 6 | −39 | 6 | 0.0682 | 0.0123 |
| 7 | −55 | 6 | 0.0891 | 0.0150 |
| 8 | −39 | 40 | 0.0739 | 0.0145 |
| 9 | −55 | 40 | 0.0910 | 0.0173 |

Figure 15:
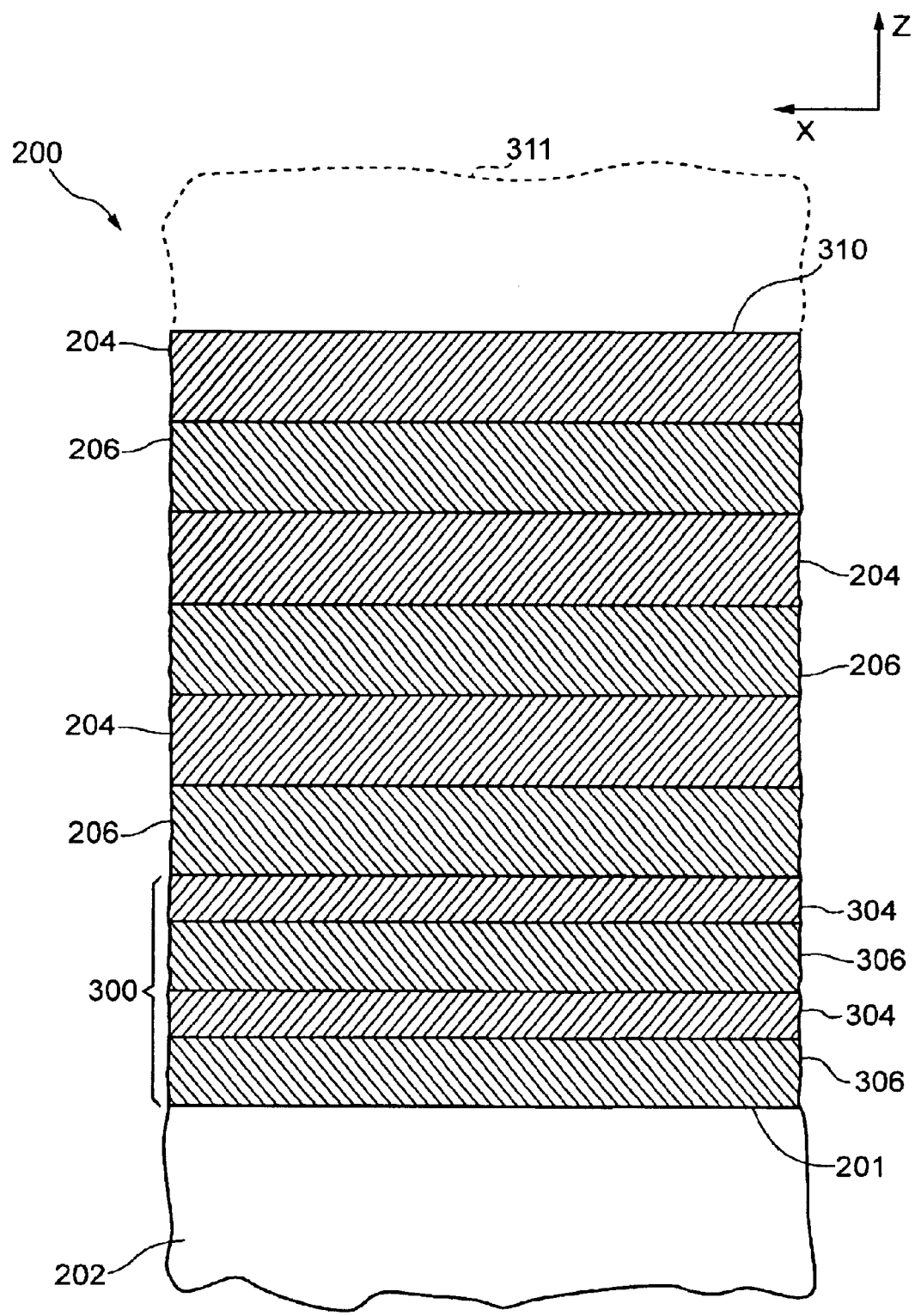
FIG. 15 is a schematic illustration of a form birefringent a multilayer coating that includes an impedance matching layer.

In various preferred embodiments, an impedance matching layer 300 such as shown in FIG. 15 is included between the form birefringence multilayer 200 and the substrate 202 i.e., the optical element, upon which the coating is formed. This impedance matching layer 300 may comprise a plurality of layers 304, 306 of material formed on the surface 201 of the optical element 202. This plurality of layers 304, 306 may comprise similar materials as the layers 204, 206 in the form birefringent multilayer structure 200. These impedance matching layers 304, 306 preferably correspond to high and low index layers comprising materials having respective high and low indices of refraction $n_1$, $n_2$. Examples of high index materials may include $LaF_3$ and $GdF_3$ having an index of refraction of 1.8 wile exemplary low index materials may include $AlF_3$ and $MgF_2$ having an index of refraction of about 1.47. Other materials may be employed in various other embodiments, and these materials need not be the same as those 204, 206 in the form birefringent multilayer structure 200. Use of similar materials, however, may simplify fabrication. In various embodiments, the thickness of the layers 304, 306 may be adjusted to provide the desired effective index of refraction of the aggregate structure 300 or the high and low index material may be deposited simultaneously to form a composite material with a refractive index between that of the two base materials.

Without impedance matching, index mismatch between the calcium fluoride optical element 202 and the effective index of the form birefringence multilayer 200 will cause reflection. Accordingly, a portion of the light propagating through the form birefringence multilayer 200 is reflected from the surface 201 of the calcium fluoride optical element 202 as a result of Fresnel reflection.

Additional Fresnel reflection is produced at the "air"/form birefringent coating interface 310. A portion of the light incident on the form birefringent coating 200 is reflected as a result of the index mismatch between the "air" (or other ambient medium) and the form birefringent coating. Conversely, light propagating through optical element 202 and the form birefringence coating 200 into the "air" will be partially reflected back into the form birefringent coating.

Figure 16A:
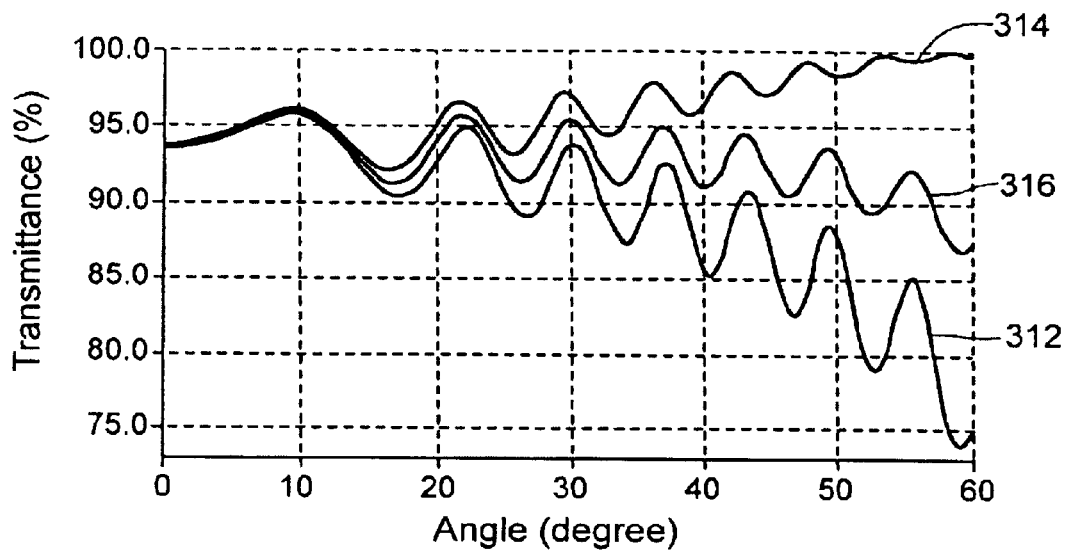
FIGS. 16A–16C are plots of transmittance (in percentage) versus angle of incidence (in degrees) for a form birefringent multilayer on calcium fluoride, a form birefringent multilayer that includes impedance matching, and bare calcium fluoride.

Together, the two reflective interfaces, i.e., the "air"/form birefringent coating interface 310 and the surface 201 of the calcium fluoride optical element 202, create a weak optical cavity. The effects of this optical cavity are illustrated in FIG. 16A which depicts the transmission of light through the form birefringent coating 200 without the impedance matching layer 300. Curves 312 and 314 represent s and p polarization, and curve 316 corresponds to an average between of these two polarizations. The curve 312, 314, 316 plot the variation of transmittance with angle of incidence. Ripple is observed in the three curves 312, 314, 316 as both reflectance and cavity resonance varies with angle of propagation of light incident on the reflective interfaces 310, 201 and through the weak optical cavity.

Figure 16B:
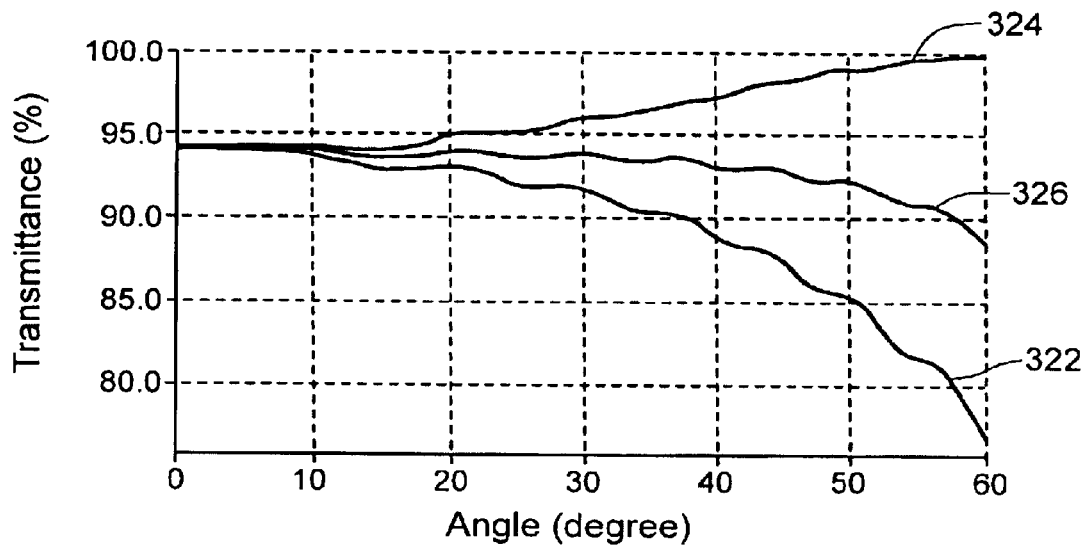

The impedance matching layer 300 between the form birefringent layers 200 and the calcium fluoride optical element 202 reduces the index mismatch at the surface 201 and preferably substantially weakens the cavity effects. FIG. 16B depicts transmission of light through the form birefringent coating 200 and the calcium fluoride optical element 202 with the impedance matching layer 300 therebetween. The form birefringent coating 200 in this example is the same structure used in connection with the example associated with FIG. 16A. Curves 322 and 324 represent s and p polarization, and curve 326 corresponds to an average between of these two polarizations. These curves 322, 324, 326 also plot the variation of transmission with angle of incidence. Ripple is substantially lessened as reflectance at the surface 201 of the calcium fluoride element 202 is reduced and the cavity affects diminish.

Figure 16C:
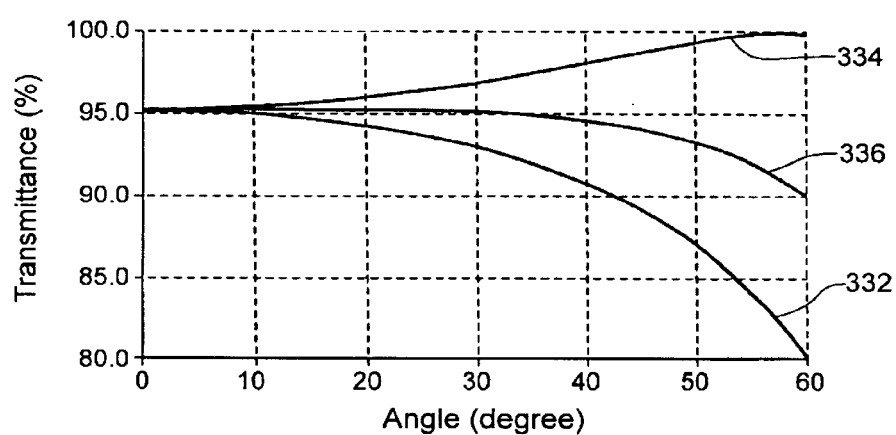

For reference, FIG. 16C shows the transmission of light through a bare calcium fluoride optical element 202. Neither the form birefringent multilayer 200 nor the impedance matching layer 300 are included in this example. Accordingly, the cavity affects such as ripple are removed. In this plot, curves 332 and 334 correspond to s and p polarization, and curve 336 represents an average between of these two polarizations.

Figure 17A:
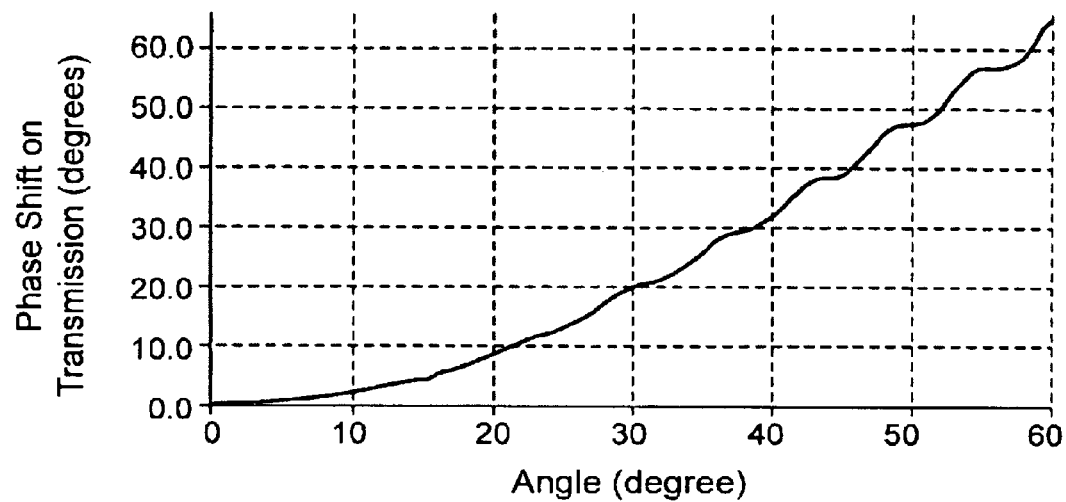
FIGS. 17A and 17B are plots of phase shift (in degrees) versus angle of incidence (in degrees) for a form birefringent multilayer on calcium fluoride without an impedance matching layer and with an impedance matching layer, respectively

Adding the impedance matching structure 300 between the form birefringent coating 200 and the calcium fluoride substrate 202 also may improve the variation in birefringence with angle of incidence. To demonstrate this effect, the phase delay between orthogonal polarization states is computed for different angles of incidence. FIG. 17A depicts this relationship for a form birefringent coating 200 on a calcium fluoride optical element 202 without an impedance matching layer 300. Irregular fluctuation, i.e., ripples, are observable in this plot.

Figure 17B:
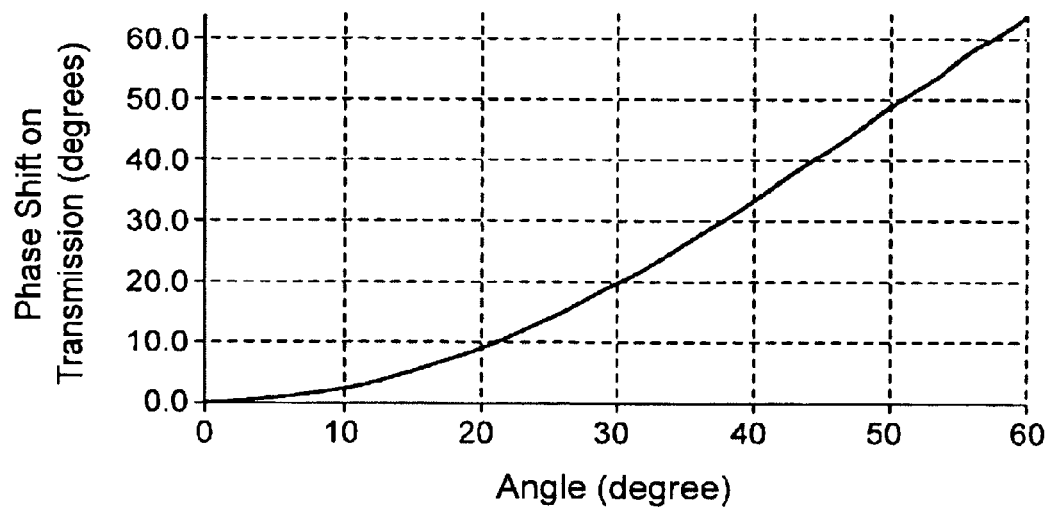

The inclusion of an impedance matching layer 300 substantially removes this ripple as shown in FIG. 17B, which plots the phase shift between the orthogonal polarizations for light incident on the structure at a variety of angles. The curve is substantially smoother than that shown in FIG. 17A.

In the examples above corresponding to FIGS. 16A–16C and 17A–17B, the wavelength of light was 157.0 nanometers and ambient was air. The form birefringent coatings 200 comprise one hundred and three (103) pairs of high and low index materials with indices of 1.8 and 1.47, respectively. These layers each have an optical thickness (index× thickness) of about 0.49 and 0.4 quarter-waves (i.e., n×t= 0.49 λ/4 and n×t=0.4 λ/4) for the high and low index materials, respectively. The impedance matching layer 300 comprises two (2) pairs of high and low index materials with indices of 1.8 and 1.47, respectively. These high and low index layers have optical thicknesses of about 0.205 and 0.295 quarter waves (i.e., n×t=0.205 λ/4 and n×t=0.295 λ/4), respectively. Preferably, these thicknesses were selected to provide an effective index of refraction for the impedance matching layer 300 having a value approximately equal to the square root of the product of the index of the calcium fluoride substrate and the effective index of the form birefringent coating, to thereby reduce the index mismatch. Other intermediate values between the effective index of the form birefringent coating and the index of calcium fluoride are possible. This impedance matching coating may be referred to as an anti-reflection coating as it reduces reflection. This example impedance matching coating is, however, meant to be exemplary and not limiting. Those skilled in the art of coating design will recognize that many other types and variation of impedance matching coatings are possible.

Accordingly, impedance matching layer 300 between the form birefringent coating 200 and the calcium fluoride substrate 202 may significantly reduce index mismatch and cavity effects created by these index mismatches. Transmission and birefringence comparable with that of an uncoated, i.e., bare calcium fluoride substrate are possible.

An anti-reflection coating 311 may also be included on the form birefringent coating 300 to reduce reflection at the "air" (ambient)/form birefringent coating interface 310. This anti-reflection (AR) coating 311 may be a conventional AR coating well known in the art such as for example a quarter-wave stack. Preferably, this AR coating 311 comprises material the same as or compatible with those in the form birefringent layer 200. This AR coating 311, may for example, comprise multiple layers of high and low index materials with indices of 1.8 and 1.47, respectively, such as $LaF_3$ and $GdF_3$, and $AlF_3$ and $MgF_2$. The type and quantity (e.g., layer thickness) of material is not to be limited to the examples described herein and other anti-reflection coating technologies including those yet to be devised are also considered possible.

Like the impedence matching layer 300, the AR coating 311 may reduce the reflections at the interface 310 so as to decrease the cavity affects and also reduce transmission losses. Other techniques may also be employed to remove cavity affects and improve transmission as well. For example, the form birefringence coating 200 may be formed on a buried layer imbedded between two calcium fluoride elements 202. A pair of impedance matching multilayer structures 300, one on each side of the form birefringent coating, may be used to reduce index mismatch between the calcium fluoride material and the form birefringent multilayers 200.

Employing form birefringence to provide a birefringence characteristic akin to a negative uniaxial crystal offers several advantages over use of a stress plate 180, 190. In some respects, a form birefringent medium is simpler to implement. A mechanical structure physically attached to the stressed optical element need not be used to apply compressive or tensile stresses. The applied stress may, in some cases, be temperature dependent for example when a tight metal band surrounds the perimeter of the optical element. Such a band may expand and contract with changes in temperature, causing the applied force and resultant birefringence to fluctuate. In other case, the stress-induced birefringent element may be easier to fabricate than certain form birefringence material structures.

Application of the various techniques and designs described herein are not to be limited only to those lens 100 discussed above but may be applied broadly to a wide range of optical systems. For example, although the lens 100 depicted in FIGS. 11 and 13 included twenty-three optical elements A1–A23, other embodiments may comprise more or less optical elements which may be reflective, diffractive, and/or refractive. Similarly, the optical elements may have spherical or aspheric surfaces, may be powered or unpowered, may be off-axis or on axis. Other optically transmissive elements may include diffractive and holographic optical elements, filters, retro-reflectors, beamsplitters, to name a few. The techniques and designs described above are useful both for imaging and non-imaging systems such as for example photolithographic imaging lenses as well as projection and condenser lenses but should not be limited to these applications alone.

Other compensation techniques may be applied to reduce retardance. One of these techniques includes, for example, adding [100] optical elements that are appropriately rotated with respect to the optical axis to provide compensation. Other methods employ a polarization rotator to provide compensation between polarization aberrations introduced by various parts of the optical system 100. Still other methods of reducing retardance and other polarization aberrations may be used in conjunction with the techniques and designs describe herein.

Also, in other embodiments, one or more of the optical elements A1, A3–A5, A8–A21, and A23 may comprise crystalline material other than cubic crystals as well as non-crystalline materials such as amorphous glasses. Fused silica is an example of such a non-crystalline material that is substantially optically transmissive to UV wavelengths such as 248 nm and 193.3 nm and is therefore compatible with such UV applications. In the case where at least some of the elements A1, A3–A5, A8–A21, A23 are crystalline, they do not need to all be the same crystal orientation. For example, various combinations of cubic crystal optical element having a [111], [100], and/or [110] crystal direction may be suitable employed.

In various of the examples described above with respect to FIGS. 11 and 13, all these transmissive optical elements A1, A3–A5, A8–A21, and A23, are [111] cubic crystalline elements. The [111] crystal lattice direction for each element A1, A3–A5, A8–A21, and A23, is along the system optical axis 106.

Choosing as many cubic crystalline elements with their respective [111] crystal lattice directions along the system optical axis is particularly advantageous for construction of optical systems 100. As discussed above, high purity cubic crystals, such as $CaF_2$ crystals for VUV optical lithography systems, naturally cleave along the (111) plane, and high optical quality single crystals are more easily grown along the [111] direction. As a result, lens blanks for construction of [111] optical elements are typically less expensive and more readily available than lens blanks oriented along other lattice directions. Furthermore, the stress optic coefficient is lower along the [111] direction than along the [100] or [110] directions, reducing image degradation resulting from mount-induced stress. Accordingly, an example of this preferred arrangement is presented, in which all powered cubic crystalline elements comprise [111] refractive optical elements oriented with their respective [111] crystal axes along the optical axis.

Alternate embodiments, however, may include optical components comprising other cubic crystal material having their crystal axes oriented differently. The lens may for example include one or more [100] and/or [110] optical elements with the respective [100] and [110] lattice directions substantially parallel to the optical axis 106. Preferably, however, the majority or more preferably a substantial majority of the cubic crystal optical elements through which the beam passes in the optical system comprise [111] optical elements. For example, 70, 80, 90, percent or more of the cubic crystalline optical elements in the path of the beam in the optical system 100 preferably comprise [111] cubic crystal optics. These percentages may apply to just the cubic crystal lens elements or may include both lens elements as well as other optical elements, such as, e.g., windows and plates. Alternatively, the percentage, by weight, of [111] cubic crystal of all the cubic crystal material in the optical path of the lens 100 is preferably more than 50%, more preferably at least about 80% and most preferably 90% or more. This percentage may include only powered refractive optical elements as well as powered and non-powered optical elements such as windows and plates, etc. For example, 90% of net weight of the cubic crystal lens 100 may comprise cubic crystal having a [111] axis oriented along the optic axis 106. In another example, 80% of the net weight of the cubic crystal optics, including the protective window A21, may be [111] cubic crystal, with the [111] axis parallel to the optic axis. The cost of materials for such a system 100 is significantly reduced in comparison with optical systems that employ more [110] or [100] crystal material. The use of a uniaxial birefringent medium and appropriate clocking in reducing the retardance aberration enables such a large percentage by weight of [111] crystal material to be used without unduly degrading the optical performance of the system 100. In other embodiments, some of the lens elements A1, A3–A5, A8–A23 or other optical elements may be formed of non-cubic crystalline material or additional lens and/or optical elements formed of non-cubic crystalline material may be used. Various suitable non-cubic crystalline materials such as dry fused silica may offer other lower cost alternatives.

Some of the preceding examples are based on a lens prescription published in the prior art. These examples are intended to be exemplary only and the principles applied with reference to these examples can be extended to any of various other lens designs. Application of techniques described above for reducing retardance aberration are of particular interest for high numerical aperture optical systems for photolithography at an exposure wavelength near 157 nm, such as that produced by an $F_2$ excimer laser. It should be understood, however, that these principles and techniques apply equally to both high and low numerical aperture systems and systems operating at other wavelengths. For example, substantial reduction in the net retardance or retardance aberrations may be reduced for high performance lenses 100 having a numerical apertures about 0.6, 0.7, 0.8, 0.9 or more. Corrections of lower numerical aperture (larger F-number) systems is also possible and is in many cases is less difficult. As discussed above, for instance, the retardance pattern for the optical elements A1, A3–A5, A8–A21, A23 may be more uniform, more circularly symmetric and more radial for lower numerical apertures.

Furthermore to estimate the effects of intrinsic birefringence in high numerical aperture lenses designed for a central wavelength of 157 nm, in which the refractive elements are primarily constructed from calcium fluoride, each element is assumed to have a peak intrinsic birefringence of $(n_e-n_o)=-1.1\times10^{-6}$, which is roughly equivalent to the measured peak intrinsic birefringence in calcium fluoride at a wavelength of 157 nm. In other embodiments, however, one or more of the optical elements may be constructed from other materials such as barium fluoride, lithium fluoride, strontium fluoride, and fused silica. In addition, optical elements comprising material exhibiting positive birefringence can be included to compensate for the effects of optical elements comprising material exhibiting negative birefringence.

The method for compensation for intrinsic birefringence in similar high numerical aperture lenses designed for 157 nm may also be demonstrated using known exemplary lens descriptions designed for a central wavelength of 193 mm as starting points. The change in central wavelength may result in a change in refractive index of the refractive components and may warrant the use of fluoride materials such as calcium fluoride, but the types of elements used and distributions of ray angles for a given numerical aperture are similar enough to allow a lens designed for a central wavelength of 193 nm to be used to demonstrate the innovative techniques for mitigating the effects of intrinsic birefringence in high numerical aperture lenses, at a central wavelength of 157 nm. The design techniques presented above, however, may be employed for reducing polarization aberration in optical systems operating at other wavelengths.

The preceding examples are intended to be illustrative, not restrictive. Furthermore, it is intended that the various exemplary techniques for countering the effects of intrinsic birefringence, including retardance aberrations and wavefront aberrations produced by variations in average index of refraction, may also be applied to the other embodiments. More generally, these basic principles used to compensate for polarization aberrations such as retardation can be extended to at least partially correct for these effects in various other optical systems. The principles apply both to refractive and catadioptric lens systems as well as other systems containing substantially optically transmissive material that imparts polarization aberrations on a beam propagating therethrough. In other optical systems, the optical features of the optical components may vary. For example, the individual thicknesses, radii of curvature, aspheric coefficients, and ray angles may differ significantly from component to component.

These principles may be used when designing new optical systems or to improve a known lens prescription. In some of the examples above, the corrected optical system is based on a given lens prescription, which may be maintained and the effects of intrinsic birefringence compensated for, using the techniques described above. Alternatively, retardation may be reduced by splitting of one or more lens elements of the given prescription, into two or more sub-elements. The location of the buried surface, its curvature and the thicknesses of the respective sub-elements are degrees of freedom that may be adjusted to reduce aberration or provide other performance attributes. For example, the optical power may be substantially evenly split into the sub-elements, which may or may not have same center thickness. The techniques and designs described above, however, may be advantageously applied to various other new lens prescriptions being designed.

Ray tracing software may be used to generate or revise the lens prescription including positioning of the individual lens elements, as well as thicknesses, radii of curvature, aspheric coefficients, material properties, and the like. In one embodiment, the RMS retardance may be computed over a pupil grid at each field point and used as the merit function for a damped least squares optimization using the commercially available ray tracing software, CODE V®, for example. A computer may be used to optimize the orientation and clocking of each of the elements in the system and the thickness of the uniaxial birefringent medium. The thicknesses of the components, the spacings between the components, and the radii of curvature and aspheric coefficients of the lens elements, may similarly be optimized to balance aberrations and reduce retardance across the field. One or more birefringent elements, wave plates, or combinations thereof, may additionally be used to correct for residual retardance variation and constant residual retardance. Phase aberrations, such as astigmatism, trefoil aberration, and quadrafoil aberration, introduced by the average index variations in [110], [111], and [100] elements, respectively, may be compensated using one or more surfaces with radii of curvature that vary as $2\theta$, $3\theta$, and $4\eta$, respectively.

When cubic crystalline materials like calcium fluoride are used, a substantial portion of these crystal elements preferably comprise lesser expensive [111] cubic crystal with the [111] crystal lattice direction parallel to the optical axis 106. Although [100] and [110] elements appropriately clocked can be added to compensate for the retardance introduced by [111] elements, the cost of these [100] and [110] elements is higher. The techniques described above advantageously permit the retardance of the [111] elements to be compensated for by other the lesser expensive [111] elements. Accordingly, the fraction of cubic crystalline elements that comprise [111] crystal with the [111] crystal lattice direction along the optical axis is preferably large, i.e., at least 70–90%, by weight. Although the uniaxial birefringent medium may be formed from various materials, it may comprise cubic crystal, such as [110], [100], or [111] cubic crystal elements. In some embodiments where the uniaxial birefringent element comprises cubic crystal, preferably it comprises mostly [111 ] cubic crystal, most preferably, all [111] cubic crystalline material. As discussed above, having many of the cubic crystal elements comprise [111] material reduced the cost of the optics. Most preferably, a majority of the transmissive optical elements have an optical axis generally aligned with the [111] crystal lattice direction. In one preferred embodiment, substantially all the optically transmissive cubic crystal elements comprise this [111] crystal.

As mentioned above, the various exemplary cubic crystalline optical systems and methods for forming aberration-free patterns on semiconductor substrates are particularly advantageous as feature sizes become increasingly smaller and approach the half or less than half wavelength of the light used to produce the patterns. Such techniques find particular advantage in high numerical aperture (NA) lens systems but the various aspects of these methods and innovations find application in optical systems having both relatively high and relatively low numerical apertures.

Although described in conjunction with photolithography tools used to pattern substrates in the semiconductor industry, the techniques and designs discussed above will find use in a wide variety of applications, both imaging and non-imaging, in infrared, visible, and ultraviolet. Optical systems used for medical, military, scientific, manufacturing, communication, and other applications are considered possible candidates for benefiting from the innovations described herein.

Although described above in connection with particular embodiments of the present invention, it should be understood the descriptions of the embodiments are illustrative of the invention and are not intended to be limiting. Accordingly, various modification and applications may occur to those skilled in the art without departing from the true spirit and scope of the invention. The scope of the invention is not to be limited to the preferred embodiment described herein, rather, the scope of the invention should be determined by reference to the following claims, along with the full scope of equivalents to which those claims are legally entitled.

What is claimed is:

1. A photolithography tool comprising:
    condenser optics positioned to receive light from a light source, said condenser optics positioned to direct an optical beam formed from said light through a reticle; and
    projection optics configured to form an image of said reticle onto a substrate, said projection optics including:
        one or more cubic crystalline lens elements receiving said directed optical beam propagated through said reticle, said one or more cubic crystalline lens elements having intrinsic birefringence which introduces retardance aberrations into said optical beam; and at least one uniaxial birefringent optical element positioned along a common optical pathway with said reticle and said one or more cubic crystalline lens elements, said uniaxial birefringent optical element comprising a uniaxial birefringent medium having a single birefringent axis, said uniaxial birefringent optical element having birefringence which introduces retardance aberrations into said optical beam that are substantially conjugate to said retardance aberrations introduced by said one or more cubic crystalline lens elements.

2. The photolithography tool of claim 1, wherein said uniaxial birefringent optical element comprises an optical element having birefringence produced by form birefringence.

3. The photolithography tool of claim 1, wherein said uniaxial birefringent optical element comprises a form birefringent optical element having birefringence produced by form birefringence, said form birefringent element comprising a multilayer structure comprising a plurality of alternating layers of high and low index.

4. The photolithography tool of claim 1, wherein said uniaxial birefringent optical element comprises a multilayer film formed on a lens.

5. The photolithography tool of claim 1, wherein said uniaxial birefringent optical element comprises a multilayer film formed on a plate.

6. The photolithography tool of claim 1, wherein said light source outputs light having a wavelength less than or equal to about 248 nm.

7. The photolithography tool of claim 1, wherein said light source outputs light having a wavelength less than or equal to about 193 nm.

8. The photolithography tool of claim 1, wherein said light source outputs light having a wavelength less than or equal to about 157 nm.

9. The photolithography tool of claim 1, wherein said light source comprises an excimer laser.

10. The photolithography tool of claim 1, wherein at least a first of the one or more cubic crystalline lens elements comprises a [111] cubic crystal having a [111] crystal lattice direction substantially parallel to an optical axis passing through said first optical element.

11. The photolithography tool of claim 1, wherein said one or more cubic crystalline lens elements comprise material selected from the group consisting of calcium fluoride, barium fluoride, lithium fluoride, and strontium fluoride.

12. The photolithography tool of claim 1, wherein said projection optics comprises a catadioptric system including at least one reflective surface.

13. The photolithography tool of claim 1, wherein said projection optics comprises a catadioptric system including at least one reflective surface, wherein said at least one reflective surface has an asymmetrical stress applied thereto to thereby reduce astigmatism, trefoil aberration, or quadrafoil aberration.

14. The photolithography tool of claim 1, wherein said birefringent optical element comprises a multilayer film formed on a lens.

15. A method for forming a semiconductor device comprising:

propagating a beam of light through a reticle;

forming an optical image of said reticle by directing said beam of light into a first portion of a projection lens comprising a plurality of [111] cubic crystalline optical elements having respective [111] cubic crystal axes aligned with a common optical axis through said [111] cubic crystalline optical elements, said beam of light becoming aberrated as a result of first retardance aberrations introduced by said first portion of said projection lens, said first retardance aberrations resulting from variation in phase with polarization, said [111] cubic crystalline optical elements being clocked so as to cause said first retardance aberration associated with light from an on-axis field point to be substantially circularly symmetrical about said optical axis at an exit pupil of said projection lens;

propagating said beam of light through a second portion of said projection lens, said second portion of said projection lens including one or more optical elements, said second portion of said projection lens selected to introduce second retardation aberrations resulting from variation in phase with polarization, said one or more optical elements causing said second retardance aberrations associated with light from an on-axis field point that propagates through said exit pupil of said projection lens to be substantially circularly symmetric about said optical axis and to substantially counter said first polarization aberrations associated with said on-axis field point at said exit pupil; and positioning a substrate, such that said optical image formed by said beam of light output by said projection lens, is formed on said substrate.

16. The method of claim 15, wherein said one or more optical elements comprise an optical element having birefringence produced by form birefringence.

17. The method of claim 15, wherein said one or more optical elements comprise a form birefringent optical element having birefrigence produced by from birefrigence, said form birefringent element comprising a multilayer structure comprising a plurality of alternating layers of high and low index.

18. The method of claim 15, wherein said one or more optical elements comprise an uniaxial birefringent optical element having a multilayer film formed on a lens.

19. The method of claim 15, wherein said one or more optical elements comprise an uniaxial birefringent optical element a multilayer film formed on a plate.

20. The method of claim 15, wherein said light has a wavelength less than or equal to about 193 nm.

21. The method of claim 15, wherein at least one of said plurality of cubic crystalline optical elements, at least one of said one or more optical elements, or both, has an aspheric surface configured to reduce wavefront aberration.

22. The method of claim 15, wherein said plurality of cubic crystalline optical elements comprise material selected from the group consisting of calcium fluoride, barium fluoride, lithium fluoride, and strontium fluoride.

23. The method of claim 15, wherein said projection lens comprises a catadioptric system including at least one reflective surface.

24. The method of claim 15, wherein said projection lens comprises a catadioptric system including at least one reflective surface, wherein said at least one reflective surface has an asymmetrical stress applied thereto to thereby reduce astigmatism, trefoil aberration, or quadrafoil aberration.

25. The method of claim 15, further comprising transmitting said beam of light through a fused silica optical element.

26. The method of claim 25, wherein said fused silica optical element is a powered lens element having a surface with an asymmetric variation in curvature configured to reduce wavefront aberration.

27. The method of claim 15, wherein said projection lens has a numerical aperture of at least 0.7.

28. A semiconductor device formed according to a process comprising:
 depositing a photosensitive material over a semiconductor wafer;
 illuminating a mask pattern;
 transmitting a beam of light along an optical path from said mask pattern through a plurality of optical elements, said optical elements having radial and tangential eigenpolarization states and said beam having first and second orthogonal polarization states each coinciding with said one of said radial and tangential eigenpolarization states such that said first polarization state is phase delayed with respect to said second polarization state;
 transmitting said beam of light, through at least one birefringent element having a single uniaxial birefringent axis, said at least one birefringent element having radial and tangential eigenpolarization states such that said second polarization state is phase delayed with respect to said first polarization state a substantially equal amount to reduce the relative phase difference between said first and second orthogonal polarization states of said beam of light;
 receiving said beam of light after said beam of light is transmitted through said at least one birefringent element, and projecting said beam of light onto said photosensitive material over said semiconductor wafer;
 removing portions of photosensitive material to form a pattern in said photosensitive material that resembles said mask pattern; and
 processing said semiconductor wafer having said patterned photosensitive material thereon.

29. The method of claim 28, wherein said birefringent optical element comprises an optical element having birefringence produced by form birefringence.

30. The method of claim 28, wherein said birefringent optical element comprises an optical element having stress-induced uniaxial birefringence.

31. The method of claim 28, wherein at least one of said plurality of optical elements includes [111] calcium fluoride cubic crystal.

32. The method of claim 28, wherein said birefringent optical element comprises a form birefringent optical element having birefrigence produced by form birefringence, said form birefringent element comprising a multilayer structure comprising a plurality of alternating layers of high and low index.

33. The method of claim 28, wherein said birefringent optical element comprises a multilayer film formed on a plate.

34. The method of claim 28, wherein said light has a wavelength less than or equal to about 193 nm.

35. The method of claim 28, wherein at least one of said plurality of optical elements has an aspheric surface configured to reduce wavefront aberration.

36. The method of claim 28, wherein at least one of said plurality of optical elements comprises a [111] cubic crystal having a [111] crystal lattice direction substantially parallel to an optical axis passing through said first optical element.

37. The method of claim 28, wherein said plurality of optical elements comprise material selected from the group consisting of calcium fluoride, barium fluoride, lithium fluoride, and strontium fluoride.

38. The method of claim 28, further comprising transmitting said beam of light through a catadioptric system including at least one reflective surface.

39. The method of claim 28, further comprising transmitting said beam of light through a catadioptric system including at least one reflective surface, wherein said at least one reflective surface has an asymmetrical stress applied thereto to thereby reduce astigmatism, trefoil aberration, or quadrafoil aberration.

40. The method of claim 28, further comprising transmitting said beam of light through a fused silica optical element.

41. The method of claim 40, wherein said fused silica optical element is a powered lens element having a surface with an asymmetric variation in curvature configured to reduce wavefront aberration.

42. The method of claim 28, wherein said plurality of optical elements and said birefringent element corresponds to a numerical aperture of at least about 0.7.

43. A photolithography tool comprising:
 condenser optics positioned to receive light from a light source, said condenser optics positioned to direct an optical beam formed from said light source through a reticle; and
 projection optics configured to form an image of said reticle onto a substrate, wherein said condenser optics include:
  one or more cubic crystalline optical elements receiving said light from said light source, said one or more cubic crystalline optical elements having intrinsic birefringence which introduces retardance into said optical beam, and
  a form birefringent optical element having form birefringence, said form birefringent optical element positioned along a common optical pathway through said one or more cubic crystalline optical elements, the form birefringent optical element introducing retardance that substantially offsets said retardance imparted on said light transmitted through said one or more cubic crystalline optical elements.

44. The photolithography tool of claim 43, wherein said from birefringent element comprises a multilayer structure comprising a plurality of alternating layers of high and low index.

45. The photolithography tool of claim 43, wherein said from birefringent optical element comprises a multilayer film formed on a lens.

46. The photolithography tool of claim 43, wherein said from birefringent optical element comprises a multilayer film formed on a plate.

47. The photolithography tool of claim 43, wherein said light source outputs light having a wavelength less than or equal to about 193 nm.

48. The photolithography tool of claim 43, wherein at least one of said one or more cubic crystalline optical elements has an aspheric surface configured to reduce wavefront aberration.

49. The photolithography tool of claim 43, wherein at least one of said one or more cubic crystalline optical elements comprises a [111] cubic crystal having a [111] crystal lattice direction substantially parallel to an optical axis passing through said first optical element.

50. The photolithography tool of claim 43, wherein said one or more cubic crystalline optical elements comprise material selected from the group consisting of calcium fluoride, barium fluoride, lithium fluoride, and strontium fluoride.

51. The photolithography tool of claim 43, wherein said projection optics comprises a catadioptric system including at least one reflective surface.

52. The photolithography tool of claim 43, wherein said projection optics comprises a catadioptric system including at least one reflective surface, where said at least one reflective surface has an asymmetrical stress applied thereto to thereby reduce astigmatism, trefoil aberration, or quadrafoil aberration.

53. A photolithography tool comprising:
  condenser optics positioned to receive light from a light source, said condenser optics positioned to direct an optical beam formed from said light through a reticle; and
  projection optics configured to form an image of said reticle onto a substrate, said condenser optics including:
    one or more cubic crystalline optical elements receiving said light from said light source, said one or more cubic crystalline optical elements having intrinsic birefringence which introduces retardance aberrations into said optical beam; and
    at least one uniaxial birefringent optical element comprising a uniaxial birefringent medium, said uniaxial birefringent optical element having birefringence which introduces retardance aberrations that are substantially conjugate to said retardance aberrations introduced by said one or more cubic crystalline optical elements.

54. The photolithography of claim 53, wherein said uniaxial birefringent optical element comprises an optical element having birefringence produced by form birefringence.

55. The photolithography tool of claim 53, wherein said uniaxial birefringent optical element comprises a form birefringent optical element having birefrigence produced by form birefringence, said form birefringent element comprising a multilayer structure comprising a plurality of alternating layers of high and low index.

56. The photolithography tool of claim 53, wherein said uniaxial birefringent optical element comprises a multilayer film formed on a lens.

57. The photolithography tool of claim 53, wherein said uniaxial birefringent optical element comprises a multilayer film formed on a plate.

58. The photolithography tool of claim 53, wherein said light source outputs light having a wavelength less than or equal to about 193 nm.

59. The photolithography tool of claim 53, wherein at least one of said one or more cubic crystalline optical elements has an aspheric surface configured to reduce wavefront aberration.

60. The photolithography tool of claim 53, wherein at least one of said one or more cubic crystalline optical elements comprises a [111] cubic crystal having a [111] crystal lattice direction substantially parallel to an optical axis passing through said first optical element.

61. The photolithography tool of claim 53, wherein said one or more cubic crystalline optical elements comprise material selected from the group consisting of calcium fluoride, barium fluoride, lithium fluoride, and strontium fluoride.

62. The photolithography tool of claim 53, wherein said projection optics comprises a catadioptric system including at least one reflective surface.

63. The photolithography tool of claim 53, wherein said projection optics comprises a catadioptric system including at least one reflective surface, wherein said at least one reflective surface has an asymmetrical stress applied thereto to thereby reduce astigmatism, trefoil aberration, or quadrafoil aberration.

* * * * *